US010417630B2

(12) United States Patent
Liu

(10) Patent No.: US 10,417,630 B2
(45) Date of Patent: Sep. 17, 2019

(54) TRANSMISSION-PULSE SEQUENCE INCLUDING PROXY FOR SECONDARY MAGNETIC STRIPE

(71) Applicant: Samsung Electronics Co., Ltd., Suwon-si, Gyeonggi-do (KR)

(72) Inventor: Zhujie (Luke) Liu, Lexington, MA (US)

(73) Assignee: Samsung Electronics Co., Ltd., Suwon-si (KR)

(*) Notice: Subject to any disclaimer, the term of this patent is extended or adjusted under 35 U.S.C. 154(b) by 320 days.

(21) Appl. No.: 15/221,700

(22) Filed: Jul. 28, 2016

(65) Prior Publication Data

US 2018/0033000 A1 Feb. 1, 2018

(51) Int. Cl.
*G06Q 20/34* (2012.01)
*G06K 7/08* (2006.01)
(Continued)

(52) U.S. Cl.
CPC ........... *G06Q 20/352* (2013.01); *G06K 7/087* (2013.01); *G06Q 20/204* (2013.01); *G06Q 20/327* (2013.01); *G06Q 20/356* (2013.01); *G07F 7/082* (2013.01); *G07F 7/084* (2013.01); *G07F 7/0886* (2013.01); *G07F 7/0893* (2013.01); *G06K 7/0004* (2013.01); *G06K 7/084* (2013.01); *G06Q 20/3224* (2013.01); *G06Q 20/40* (2013.01); *G06Q 20/405* (2013.01); *G06Q 20/4014* (2013.01); *G06Q 20/4016* (2013.01); *H04W 4/80* (2018.02)

(58) Field of Classification Search
CPC .... G06Q 20/352; G06Q 20/204; G06Q 20/20; G06Q 20/322; G06Q 20/3278; G06Q 20/202; G06Q 20/327; G06Q 20/356; H04W 4/80; H04W 4/008; G06K 7/087
USPC .......................................................... 705/17
See application file for complete search history.

(56) References Cited

U.S. PATENT DOCUMENTS 5,834,747 A 11/1998 Cooper
6,053,415 A 4/2000 Norwood
(Continued)

FOREIGN PATENT DOCUMENTS

CN 105760920 A 7/2016
EP 3 033 711 A1 6/2016

OTHER PUBLICATIONS

Novak, Edmund James. Security and Privacy for Ubiquitous Mobile Devices. The College of William and Mary, ProQuest Dissertations Publishing, 2016.*
(Continued)

*Primary Examiner* — Nathan C Uber
(74) *Attorney, Agent, or Firm* — Jefferson IP Law, LLP

(57) ABSTRACT

A contactless payment device and method streams a sequence of magnetic-field pulses directly to two magnetic-stripe read heads of a point-of-sale terminal. The stream of pulses includes essential information needed to approve a transaction. The essential information is structured for a primary "channel" associated with one of the read heads. A series of "proxy" bits are included in the stream in order to satisfy the data collection requirements for a secondary channel associated with the other read head. The proxy bits are included in a custom bit stream that may be used to improve acceptance of payment transmission data at a POS terminal.

20 Claims, 15 Drawing Sheets

(51) Int. Cl.
  *G06Q 20/20* (2012.01)
  *G07F 7/08* (2006.01)
  *G06Q 20/32* (2012.01)
  *G06Q 20/40* (2012.01)
  *G06K 7/00* (2006.01)
  *H04W 4/80* (2018.01)

(56) References Cited

U.S. PATENT DOCUMENTS

| | | |
|---|---|---|
| 6,308,890 B1 | 10/2001 | Cooper |
| 8,313,037 B1 | 11/2012 | Humphrey |
| 8,376,239 B1 | 2/2013 | Humphrey |
| 8,628,012 B1 | 1/2014 | Wallner |
| 8,727,219 B1 | 5/2014 | Mullen |
| 2002/0003169 A1 | 1/2002 | Cooper |
| 2004/0251303 A1 | 12/2004 | Cooper |
| 2006/0186212 A1 | 8/2006 | Cooper |
| 2007/0034700 A1 | 2/2007 | Poidomani et al. |
| 2007/0241183 A1 | 10/2007 | Brown et al. |
| 2008/0040284 A1 | 2/2008 | Hazel et al. |
| 2008/0135630 A1 | 6/2008 | Cooper |
| 2009/0173785 A1 | 7/2009 | Cooper |
| 2010/0270373 A1 | 10/2010 | Poidomani et al. |
| 2011/0028184 A1 | 2/2011 | Cooper |
| 2011/0240745 A1 | 10/2011 | Brown |
| 2011/0266354 A1 | 11/2011 | Poidomani et al. |
| 2012/0039469 A1* | 2/2012 | Mueller ............ G06Q 20/12 380/252 |
| 2012/0097739 A1* | 4/2012 | Babu ............ G06Q 20/3224 235/380 |
| 2012/0205451 A1 | 8/2012 | Poidomani et al. |
| 2012/0234927 A1 | 9/2012 | Poidomani et al. |
| 2012/0235794 A1 | 9/2012 | Poidomani et al. |
| 2012/0235797 A1 | 9/2012 | Poidomani et al. |
| 2012/0241523 A1 | 9/2012 | Poidomani et al. |
| 2013/0112756 A1 | 5/2013 | Poidomani et al. |
| 2014/0108260 A1 | 4/2014 | Poole et al. |
| 2015/0149291 A1 | 5/2015 | Abdala |
| 2015/0186877 A1 | 7/2015 | Brown |
| 2015/0371234 A1 | 12/2015 | Huang et al. |
| 2016/0162883 A1 | 6/2016 | Liscia et al. |
| 2017/0109738 A1 | 4/2017 | Brown |

OTHER PUBLICATIONS

International Search Report, dated Oct. 12, 2017, 3 pages.
Extended European Search Report dated May 6, 2019, issued in European Application No. 17835026.0.

\* cited by examiner

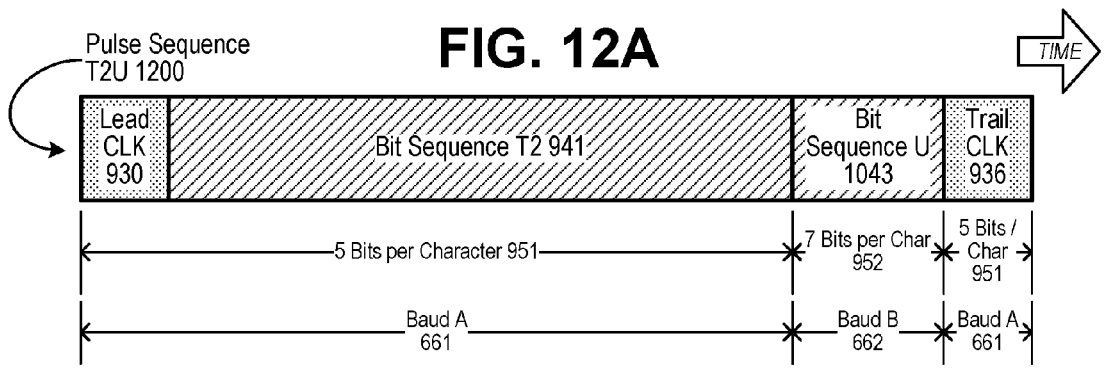
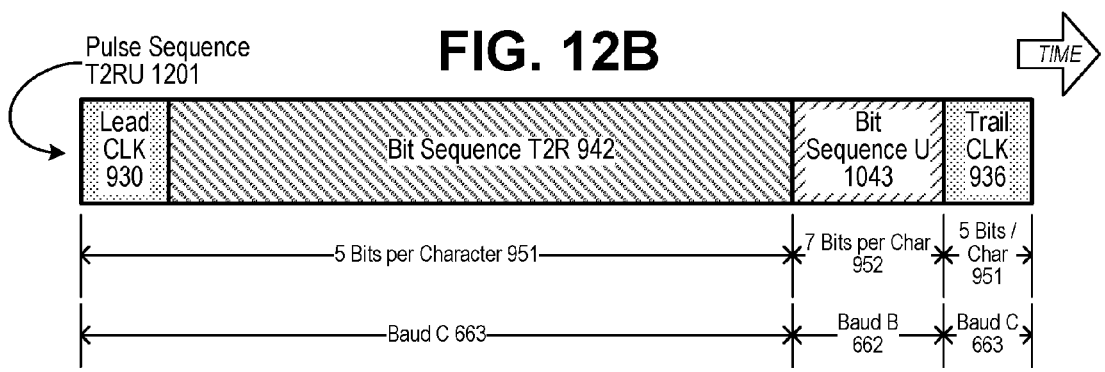
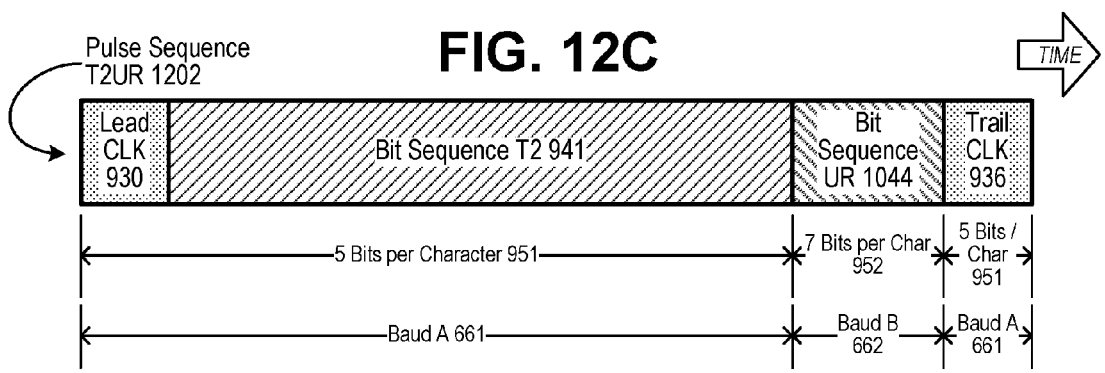
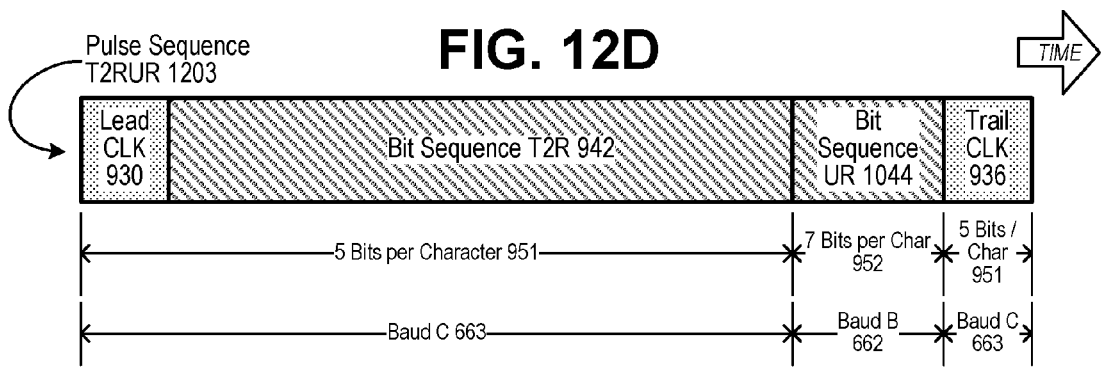

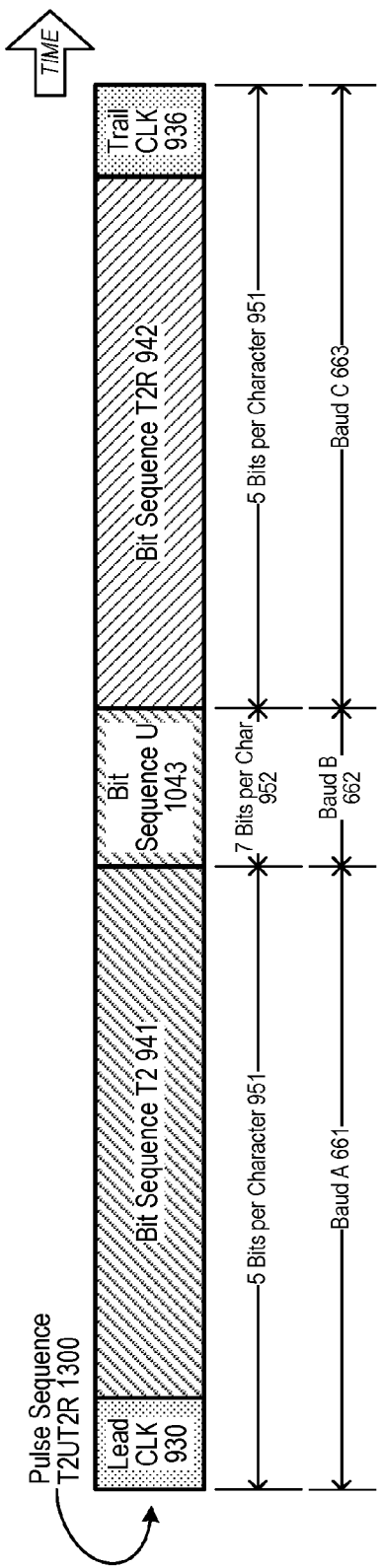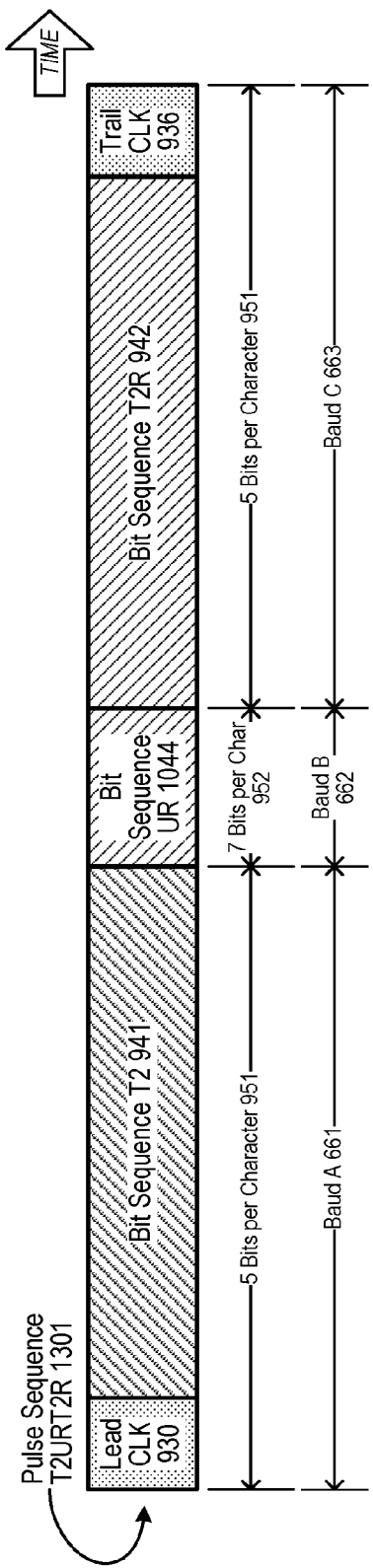

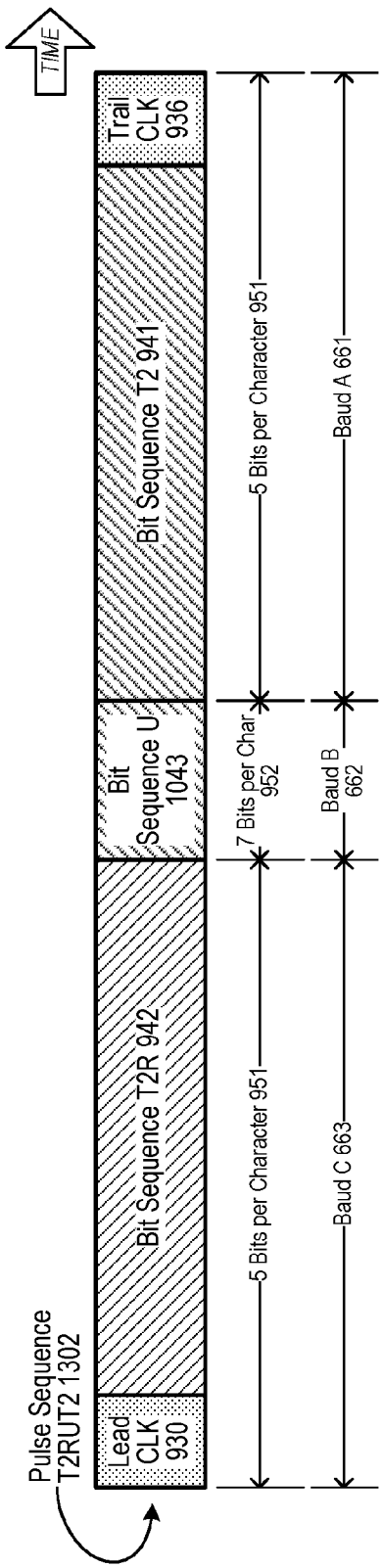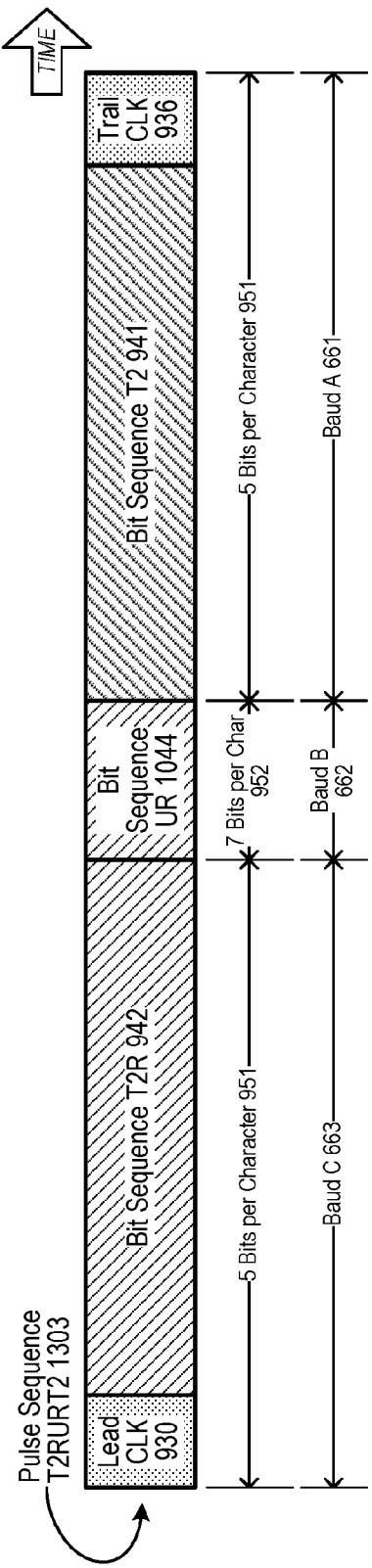

US 10,417,630 B2

TRANSMISSION-PULSE SEQUENCE INCLUDING PROXY FOR SECONDARY MAGNETIC STRIPE

FIELD

The present invention relates to systems and methods for encoding, transmitting, and validating information ordinarily stored on a magnetic stripe card.

BACKGROUND

Reading data from the magnetic stripes on credit and debit cards has primarily been performed by swiping the magnetic stripe against reader heads of a magnetic stripe reader (MSR). The data contained in the magnetic stripe is encoded in discrete tracks (channels) whose content and format are mutually incompatible. The movement of the card causes the fields produced by magnetic domains contained in the stripe to induce voltages in the MSR's read heads. An MSR is capable of reading the data from one or more tracks/channels, and includes a read head for each channel that will be read. The MSR reads the data encoded in a track by converting a sequence of voltages induced in a channel's read head into a series of binary bits. The tracks are spaced closely to each other, so each read head is precisely lined up with a corresponding track of the magnetic stripe.

A typical magnetic stripe with its tracks is described with reference to FIG. 1. As illustrated, there are three tracks of data (labeled as 101, 102, and 103), which are encoded in the magnetic stripe 11. On a standard credit/debit card, the magnetic stripe is located 0.223 inches (5.66 mm) from the edge of the card. A width 111 of each of the three tracks is 0.110 inches (2.79 mm). Each track conforms to a different encoding standard 112. The standard 112 corresponding to a track specifies the respective track's recording density 113 and character configuration 114 (in terms of bits-per-character and character type). Each track may contain a different number of characters (Information Content 115), with the maximum number of characters in each track specified in the corresponding standard 112.

The format of Track 1 101 was specified in a standard 112a developed by the International Air Transaction Association (IATA) for the automation of airline ticketing or other transactions where a reservation database is accessed. Track 1 101 typically has a recording density 113a of 210 bits per inch (8.27 bits per mm). The character configuration 114a of Track 1 101 is 7-bit alphanumeric characters. The information content 115a (including control characters) is limited to a maximum of 79 characters.

The format of Track 2 102 was specified in a standard 112b developed by the American Bankers Association (ABA) for the automation of financial transactions. Track 2 information is also used by most systems that require an identification number and other control information. Track 2 102 typically has a recording density 113b of 75 bits per inch (2.95 bits per mm). The character configuration 114b of Track 2 102 is 5-bit numeric characters (plus 5-bit control characters). The information content 115b (including control characters) is limited to a maximum of 40 characters.

The format of Track 3 103 is specified by a standard 112c developed by the Thrift-Savings industry. Track 3 103 typically has a recording density 113c of 210 bits per inch (8.27 bits per mm). The character configuration 114c of Track 3 103 is 5-bit numeric characters (plus 5-bit control characters). The information content 115c (including control characters) is limited to a maximum of 107 characters. Track 3 103 is unused by many of the major worldwide financial networks, and sometimes is not even physically present on a card, allowing for a narrower magnetic stripe. However, Track 3 103 is used in certain places, e.g. China, typically as an alternative to Track 2 102.

FIG. 2 illustrates an example data structure stored on Track 1 101 of a payment card. Track 101 may include the following fields (in this order):

SS|FC|PAN|FS|Name|FS|Additional Data|Discretionary Data|ES|LRC.

The data structure of Track 1 comprises a one-character Start Sentinel (SS) 210 and a one-character End Sentinel 226, with up to 76 data characters (211) in-between. The Start Sentinel (SS) 210 and the End Sentinel 226 are "control" characters specified by the track standard 112a. The data characters 211 may also include control characters, such as characters that delimit between fields. An example of a control character included within the data sequence 211 is a Field Separator 216.

The one-character Start Sentinel (SS) 210 indicates the beginning of the data structure and consists of a "%" character. A one-character Format Code (FC) 212 is an alphabetic-only (A-to-Z) character and indicates the card type. A Primary Account Number (PAN) field 214 comprises the credit/debit card number, is always numerical, and contains up to 19 digits. The one-character Field Separators (FS) 216a and 216b delimit different fields and each consists of a "^" character. A Name field 218 corresponds to the name of a particular card account holder, and consists of two-to-twenty-six character alphanumeric characters. If the Name field 218 is not used, it may be replaced with a blank-space character followed by a "/" character.

An Additional Data field 222 typically includes up to seven numbers. Four of the numbers may indicate an expiration date of the card in a YYMM format. If the date field information is not included, another field separator 216 may be included instead. Three of the numbers of the Additional Data field 222 may be a three-character service code relating to the types of charges that may be accepted. If the service code field is omitted, another field separator 216 may be included instead.

A Discretionary Data field 224 includes data used for card verification information. Examples of the discretionary data include a one-character PIN Verification Key Indicator (PVKI), a four-character PIN Verification Value (PVV) or Offset, and a three-character Card Verification Value (CVV) or Card Validation Code (CVC). The one-character End Sentinel (ES) 226 indicates an end of the data structure and consists of a "?" character. A one-character Longitude Redundancy Check (LRC) 228 is included at the end of the data structure to provide verification that Track 1 101 was accurately read by the MSR.

FIG. 3 illustrates an example data structure stored on Track 2 102. Track 2 102 may include the following fields (in this order):

SS|PAN|FS|Additional Data|Discretionary Data|ES|LRC.

The data structure of Track 2 comprises a one-character Start Sentinel (SS) 310 and a one-character End Sentinel 326, with up to 37 data characters (311) in-between. The Start Sentinel (SS) 310 and the End Sentinel 326 are "control" characters specified by the track standard 112b. The data characters 311 may also include control characters, such as characters that delimit between fields. An example of a control character included within the data sequence 311 is a Field Separator 316.

The one-character Start Sentinel (SS) 310 indicates the beginning of the data structure and consists of a ";" character. A Primary Account Number (PAN) field 314 is similar to the PAN 214 in Track 1. The PAN field 314 comprises the credit/debit card number, is always numerical, and contains up to 19 digits. The one-character Field Separator (FS) 316 consists of a "=" character. The Additional Data field 322 is similar to the Additional Data field 222 in Track 1 101, and may include the expiration date field and the service code field, with a Field Separator (FS) 316 substituted if a field is omitted. A Discretionary Data field 324 includes data like that described in connection with the Discretionary Data field 224 in Track 1 101. The one-character End Sentinel (ES) 326 indicates an end of the data structure and consists of a "?" character. A one-character Longitude Redundancy Check (LRC) 328 is included at the end of the data structure to provide verification that Track 2 102 was accurately read by the MSR.

FIG. 4 illustrates an example data structure stored on Track 3 103. Track 3 103 may include the following fields (in this order):

SS|FC|PAN|FS|Use and Security Data|Additional Data|ES|LRC.

The data structure of Track 3 comprises a one-character Start Sentinel (SS) 410 and a one-character End Sentinel 426, with up to 104 data characters (411) in-between. The Start Sentinel (SS) 410 and the End Sentinel 426 are "control" characters specified by the track standard 112c. The data characters 411 may also include control characters, such as characters that delimit between fields. An example of a control character included within the data sequence 411 is a Field Separator 416.

The one-character Start Sentinel (SS) 410 indicates the beginning of the data structure and consists of a ";" character. A two-digit Format Code (FC) 212 is numeric-only (00-to-99). A Primary Account Number (PAN) field 414 is similar to the PAN fields 214 and 314, containing up to 19 digits. The one-character Field Separator (FS) 416 consists of a "=" character. A Use and Security Data field 420 includes a variety of sub-fields related to currency types, payment limits, payment cycles, and card security. Sub-fields that are omitted may be replaced with a Field Separator (FS) 416.

An Additional Data field 422 may include fields indicating optional subsidiary account numbers, a digit relay marker field, a six digit crypto check field containing a validation value used to verify the integrity of Track 3 content, and various additional data. Field Separators (FS) 416 may be placed between subfields, and substituted for sub-fields such as the crypto-check data field if omitted. The one-character End Sentinel (ES) 426 indicates an end of the data structure and consists of a "?" character. A one-character Longitude Redundancy Check (LRC) 428 is included at the end of the data structure to provide verification that Track 3 103 was accurately read by the MSR.

FIG. 5 illustrates a typical structural arrangement of MSR read heads 500, including a Track 1 read head 501 and a Track 2 read head 502. Such dual-head arrangements are commonly used in Point-Of-Sale (POS) terminals to read credit and debit cards. In operation, the stripe 11 is inserted into a slot in a housing of the POS terminal (not illustrated) and is swiped or passed by the two read heads 501/502 in a Magnetic Stripe Reader (MSR) component of the POS. As the magnetic stripe 11 passes by the heads, the first read head 501 is used to read the data stored in Track 1 101 and the second read head 502 is used to read the data stored in Track 2 102. Software typically installed in the POS terminal processes the data received from the MSR. Depending upon the depth of the slot and the spacing between the heads 501 and 502, dual-head MSRs can be configured to read other track combinations, such as reading Track 1 101 and Track 3 103, or reading Track 2 102 and Track 3 103. POS terminals with three read heads are able to read all three tracks of the stripe 11, but are less common than dual-head configurations.

Disadvantageously, the data on the magnetic stripe 11 of a conventional credit or debit card is static and subject to copying and fraud. In recent years, to reduce the fraud associated with static magnetic stripe cards, electronic cards and contactless payment methods have been developed. Electronic cards and contactless methods allow the data that is provided to a POS terminal to be dynamically modified, making such approaches less susceptible to copying fraud than conventional magnetic stripe payment cards.

An example of a contactless method uses Near-Field Communications (NFC). NFC employs electromagnetic induction between a loop antenna in a handheld device and a loop antenna in a POS terminal to exchange information. In order to be compatible with contactless methods like NFC, each POS terminals must include the needed loop antenna and receiver.

Another example of a contactless method uses an inductive loop to interact directly with the magnetic read heads (e.g., 501, 502) of the MSR. As a result, the POS terminal does not require any special capabilities. For example, the POS terminal is not required to have a Near-Field Communication (NFC) receiver. Instead, a magnetic stripe simulating device is held in close proximity to the MSR of a POS terminal and emits a sequence of magnetic pulses. The simulating device generates the pulse sequence by applying a time-modulated alternating current to an inductive loop. The alternating current that is applied to the loop induces the magnetic field received by the magnetic read heads (e.g., 501, 502) of the MSR. Typically, the inductive loop needs to be within approximately three inches (7.6 cm) of the read heads. The field generated by the loop dissipates rapidly beyond that point, which helps prevent the pulse sequence from being picked up by eavesdropping devices.

With conventional magnetic stripes, the fields generated by the magnetic domains that correspond to the data in each track are narrow and confined to the reading aperture of the corresponding read-head channel. For example, the influence of the field generated by Track 1 101 is confined to the read head 501, and the field generated by Track 2 102 is confined to the read head 502.

In comparison, the electronically-simulated magnetic stripes in electronic cards and the inductive-loop magnetic field transmissions to MSRs both produce wider fields than conventional magnetic stripes, resulting in the magnetic fields leaking into the pick-up channel(s) of adjacent track(s). Because the different tracks' data are encoded differently and are mutually incompatible, the leakage of a specific track's magnetic fields into an adjacent track's read head can cause reading errors. For example, if the magnetic field sequence corresponding to the higher density seven-bit characters of Track 1 101 leaks into the Track 2 read head 502, the data parsing software that was expecting the five-bit characters of Track 2 102 may indicate an error. Conversely, when Track 2 102 data leaks into Track 1 read channel, the encoded data and the LRC may be incorrectly decoded.

Because of the close proximity of the tracks in a standard card stripe 11 and because of a lack of standardization among card readers, it is difficult to prevent the cross-channel leakage of track data between adjacent channels.

Cross-channel leakage is particularly problematic when using an inductive loop to interact directly with the magnetic read heads, since the emitted field necessarily interacts with more than one read head. While the POS terminal decoder software is designed to accommodate relatively minor track noise, such as the noise generated by scratches and small defects in the magnetic stripe 11, the decoder software can be easily overwhelmed by the substantial errors caused by cross-channel leakage. Unable to handle these exception conditions, the POS terminal will terminate the transaction and/or display an error message that can confuse customers and terminal operators.

SUMMARY

This disclosure relates generally to an improved contactless payment process that streams sequences of magnetic-field pulses directly to the read heads (e.g., 501, 502) of a POS terminal with a higher degree of reliability of reading the pulse transmissions. The improved process enables a single stream of pulses to provide the essential primary track data required to verify a card's account information for transaction approval, while also satisfying data collection requirements for a secondary track. Rather than reproducing the sequence from the secondary track, a "proxy" data sequence in the form of custom bit streams are emitted before and/or after the primary sequence. The proxy data sequence, which can be customized as a function of the reading characteristics of different POS terminals, appears as noise to the POS terminal's primary channel decoder, without exceeding the decoder's noise limit tolerance. The improved process enhances the read accuracy and reduces read errors, and the proxy data sequence can be "tuned" with customized bit stream(s) based on empirical testing of pulse transmissions on POS terminals from different manufacturers.

The present disclosure describes a system and method that overcomes the leakage issues and reduces problematic magnetic stripe reading errors caused by electronic transmission of electronic stripe data, thereby improving the business performance of the POS magnetic stripe reading devices reading electronic cards or magnetic contactless payment devices that employ electronically simulated magnetic stripes. The disclosed bit sequences will also work with cards that can be swiped through an MSR, including electronic cards that have all or a portion of a conventional magnetic stripe replaced with MEMS (microelectromechanical systems) coil arrays composed of microscopic inductive loops that are embedded in the card.

BRIEF DESCRIPTION OF THE DRAWINGS

FIGS. 12A to 12H illustrate embodiments of the improved pulse sequence transmissions based on the frameworks in FIGS. 6A and 6B in which the primary channel corresponds to Track 2 and the secondary channel corresponds to Track 1.

FIGS. 13A to 13D illustrate embodiments of the improved pulse sequence transmissions based on the frameworks in FIGS. 6C and 6D in which the primary channel corresponds to Track 2 and the secondary channel corresponds to Track 1.

DETAILED DESCRIPTION

Figure 1:
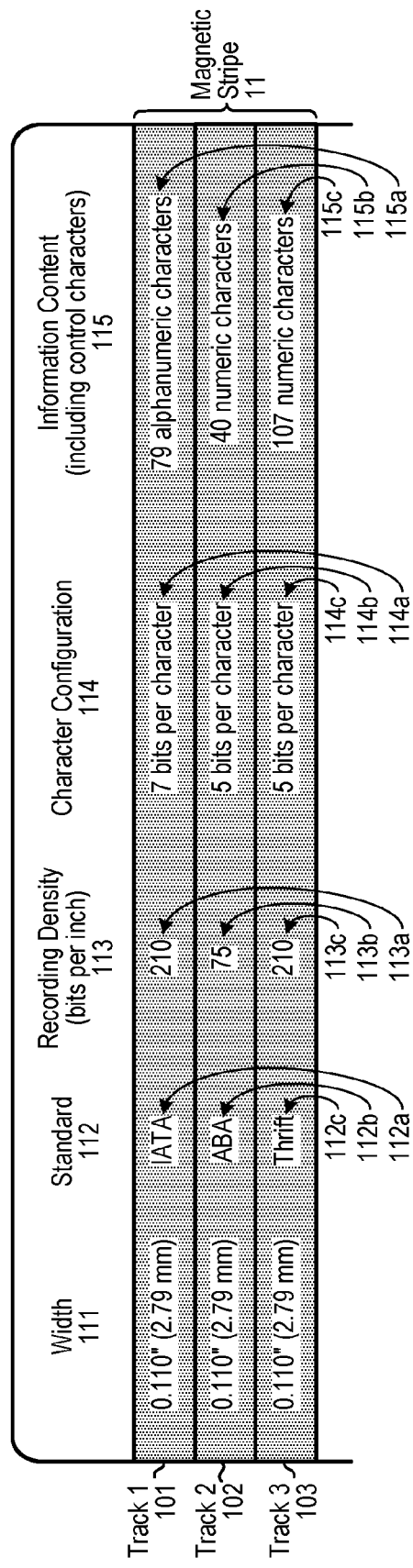
FIG. 1 illustrates a typical magnetic stripe and its tracks in accordance with existing industry standards.
Figure 2:
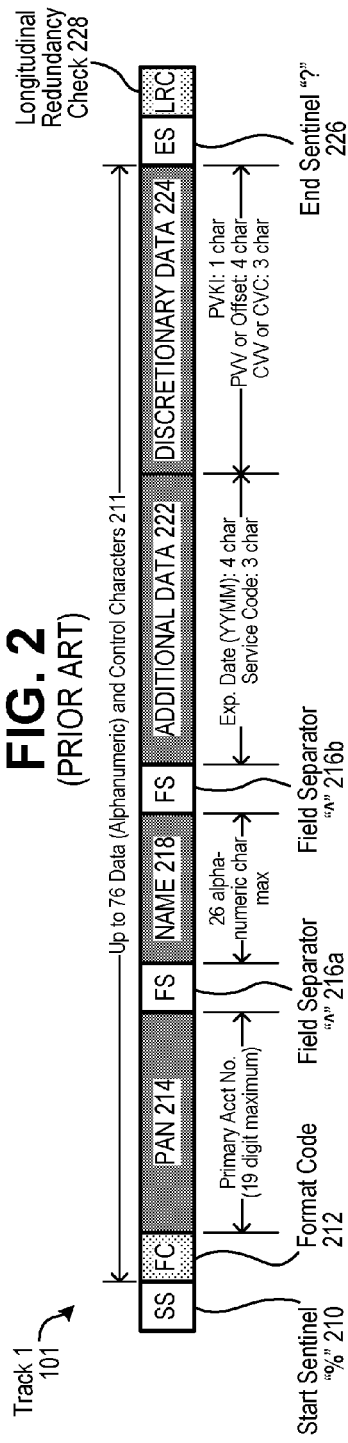
FIG. 2 illustrates a structure of the data encoded on the first track of the magnetic stripe of FIG. 1 in accordance with existing industry standards.
Figure 3:
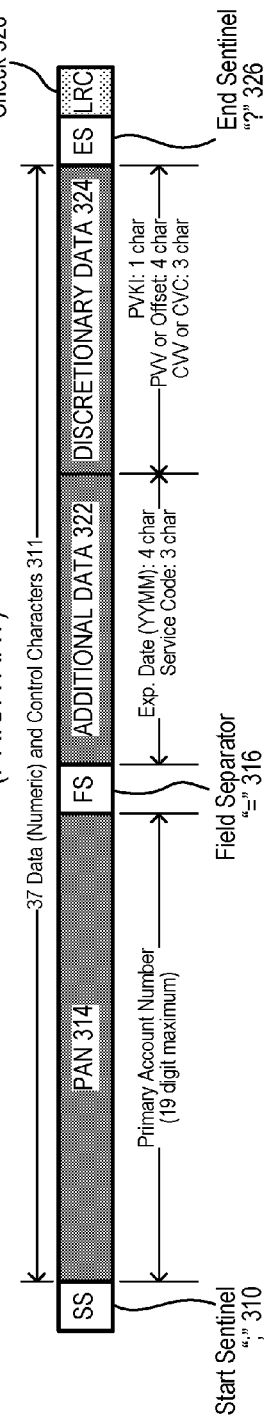
FIG. 3 illustrates a structure of the data encoded on the second track of the magnetic stripe of FIG. 1 in accordance with existing industry standards.
Figure 4:
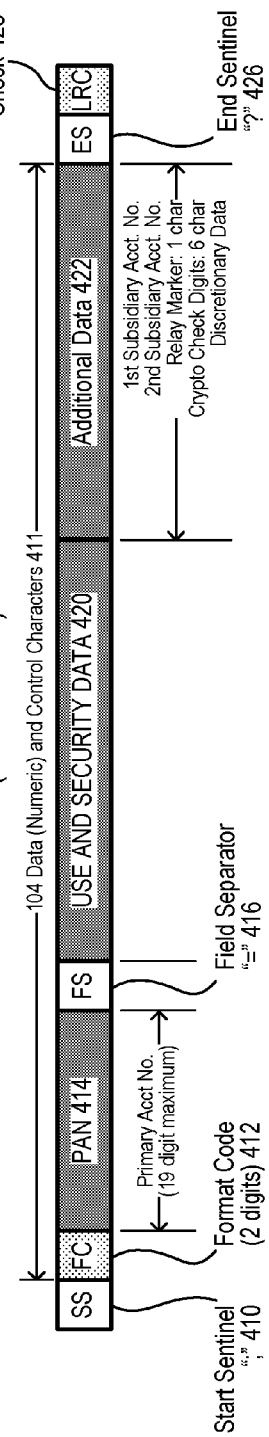
FIG. 4 illustrates a structure of the data encoded on the third track of the magnetic stripe of FIG. 1 in accordance with existing industry standards.
Figure 5:
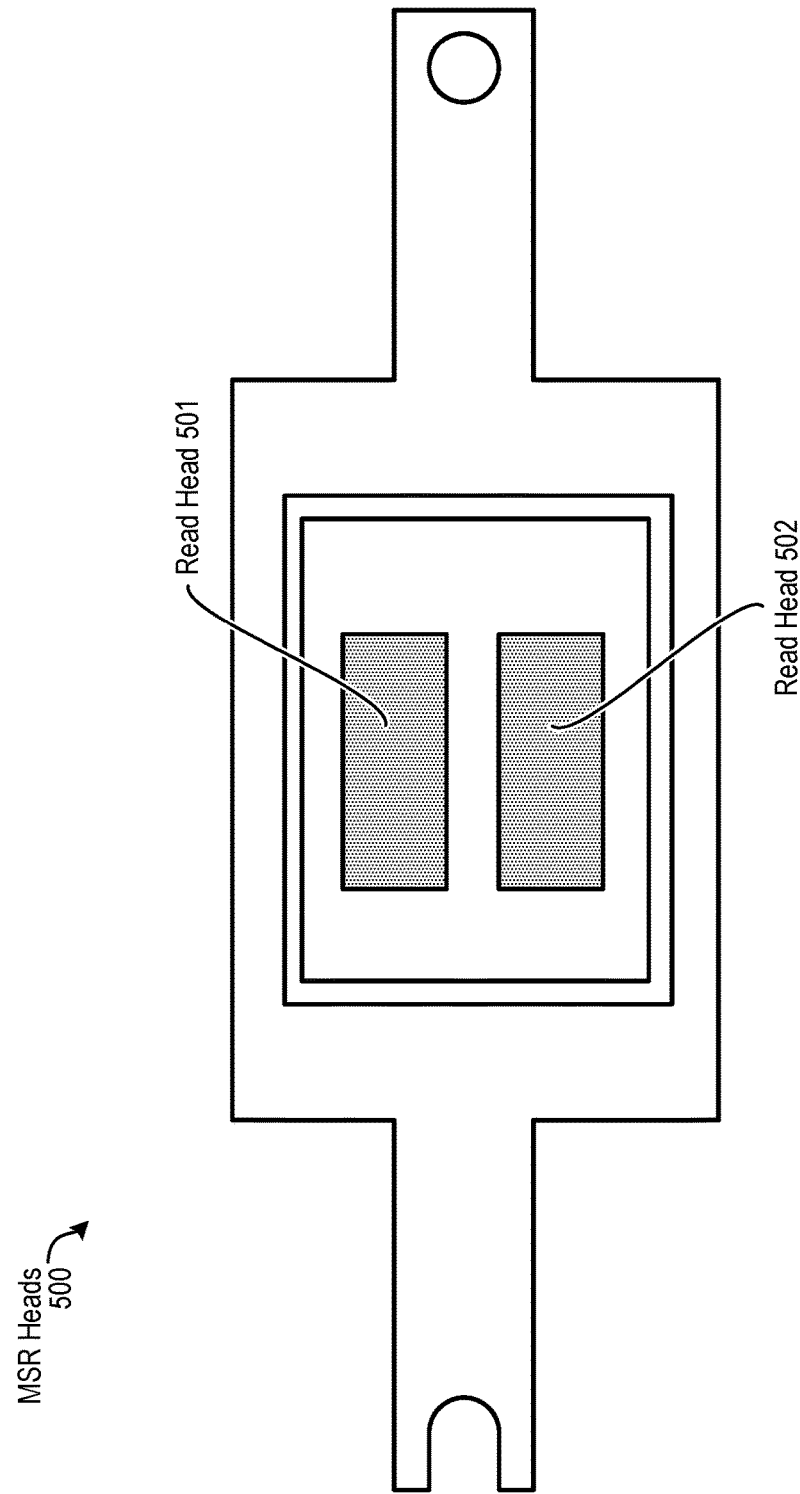
FIG. 5 illustrates a structural arrangement of a magnetic stripe reader (MSR) including two read heads, as is commonly used with or included in point-of-sale (POS) terminals.

Ordinarily, the data from a secondary channel, e.g. Track 1 data, might be collected by a POS terminal, but then is not verified as part of the transaction approval process. The financial services companies that process card payments typically rely on the data from a single, primary track, e.g. Track 2 data, to validate a transaction. However, merchants sometimes wish to collect extra data from another track, such as collecting the data from the Name field 218 of Track 1 101, even if the transaction can be approved by the transaction processor with only data from Track 2 102 or Track 3 103. Merchants may collect such information for their own purposes, such as marketing or customer tracking.

There are several ways the merchant's system might collect the extra data. One approach is for the merchant's own payment processing software to collect the secondary data as a requirement before the primary track data (e.g., Track 2 sequence 311 or Track 3 sequence 411) is relayed by the POS terminal to the financial services network for transaction approval. For example, if the Name field 218 data from Track 1 101 is not received by the MSR, the merchant's payment processing system may forgo sending the primary track data for approval, or otherwise cancel the transaction. Another approach is to forward all of the data collected to the financial services network, and then receive the Name field 218 data (unverified) bundled with the reply that authorizes the transaction. In any case, if this secondary channel data is not received, the merchant's system may cancel the transaction even though the primary channel data ordinarily needed for transaction approval was collected in its entirety.

Field experiments with POS terminals from a wide variety of vendors indicate that the software used by the POS terminals is tolerant of the data for one track not being received at the exact same time as the data of another track, so long as the sequence of pulses corresponding to each track are received in close proximity. For example, if a POS system will rely on the data from Track 2 102 for card verification and transaction approval, but the data from the Track 1 Name field 218 is also collected for other purposes, the software will tolerate receiving the data interpreted as the Name field 218 before or after receiving the Track 2 data.

Since the secondary channel data may not be verified/validated, substitute data ("proxy data") can be used in its place without compromising transaction approval. Depending upon whether the quantity of proxy data is within the tolerance of the primary channel decoder's noise tolerance limits, the primary channel decoder might ignore the proxy data as noise. To better handle issues like cross-track leakage, most POS terminals will reject extraneous signals as noise if the signals do not conform to the format expected for a specific read channel. Most POS terminal decoders will simply filter out bits deemed to be noise, rejecting the "noise" bits as not being meaningful.

How much noise a decoder will tolerate before rejecting a bit sequence depends in part on where in the sequence the noise occurs, and varies between POS terminal models and vendors. As a result, a quantity of proxy data can be inserted into the beginning or end of the primary channel pulse sequence that is received by the primary channel read head, without the sequence being rejected (or, according to the present disclosure, in order to improve the likelihood that the sequence will not be rejected). The pulses of the proxy data preceding or following the expected primary sequence are simply discarded by the primary channel's decoder as noise, while the data from the pulse sequence in the expected format used by the primary channel is retained. Similarly, the primary channel pulse sequence will be discarded by the secondary channel's decoder.

The bit rate (baud) produced by the tracks of a magnetic stripe 11 when a card is swiped through an MSR depends both on the recording density 113 of the respective track and the speed with which the card is swiped. To accommodate this variation in swipe speed, the decoders of the MSR that receive the pulse sequences from the read heads 501 and 502 are tolerant of a wide range of bit rates. Based on field experiments, the pulse demodulation performed by each channel decoder is independent of the other. In other words, each channel decoder independently determines a bit rate for the track data it is configured to receive, without regard to the bit rates detected on any other channel. So, for example, if the Track 1 and the Track 2 pulses are received at a same rate, and that rate is within the tolerances of each of the corresponding channel decoders, then both decoders should recover their respective channel data, even though the Track 1 data should theoretically be received at a higher bit rate than the Track 2 data (based on a ratio of the recording densities 113*a* and 113*b*).

The MSRs of modern POS terminals are able to recover the encoded bit sequence in a track without regard to whether a magnetic stripe 11 is swiped forward or backward. To accommodate this, the MSRs are able to recover bit sequences in accordance with the track standards 112 in either the regular or reverse order. A POS terminal may look for the Start Sentinel (210/310/410) at either end of the bit sequence to determine how to process received data.

Experiments were performed on a variety of POS terminals to determine whether it was possible to provide "proxy pulses" prior to the pulses conveying stripe data in order to improve the chances that the channel data would be properly received and decoded by the MSR's decoders (i.e. no error received). In view of the ability of POS terminals to read stripe data forward and backward, experiments were performed using two groups of pulses: forward-forward, backward-backward, backward-forward, and forward-backward combinations.

If the first group of pulses is properly received and decoded, the transaction should be successful without regard to the second group. If the first group of pulses is rejected but the second group of pulses was received (i.e. in a second swipe) and decodes correctly, the transaction should go through. If both swipes produce noise/errors (i.e. are not decoded correctly), the transaction will fail.

As noted above, the design and operation of POS terminals is not standardized so there was no certainty that providing extra/proxy pulses or a duplicate copy of the primary channel data would improve results. However, it has been determined that the success rate for transaction approval increases when the contactless payment device provides the extra/proxy pulses and/or a duplicate copy of the primary channel data. Thus, according to the disclosure, as discussed hereinafter, "custom bit streams" may be added to the Track 1 and/or Track 2 data to improve acceptance of data at POS terminals when the contactless payment device transmits magnetic stripe data.

FIGS. 6A to 6D illustrate frameworks used to create improved pulse transmission sequences 600-603 to convey the data for a primary channel and proxy bits in a forward (632) and/or reverse (634) bit order for a secondary channel. The proxy bit stream is concatenated onto the beginning (632*a*/634*a*) and/or the end (632*b*/634*b*) of a primary channel bit sequence "TA" 641, or the primary channel bit sequence in reverse-bit order "TAR" 642. Each pulse sequence 600-603 may be transmitted directly to the read heads (e.g., 501, 502) of an MSR using an inductive loop.

Figure 6A:
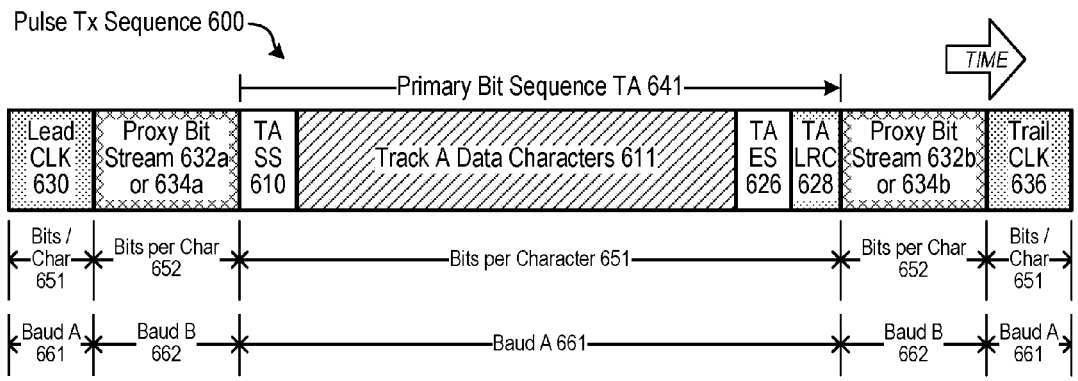
FIGS. 6A to 6D illustrate frameworks used to create improved pulse sequence transmissions that include both the data for a primary channel and proxy bits for a secondary channel.
Figure 6B:
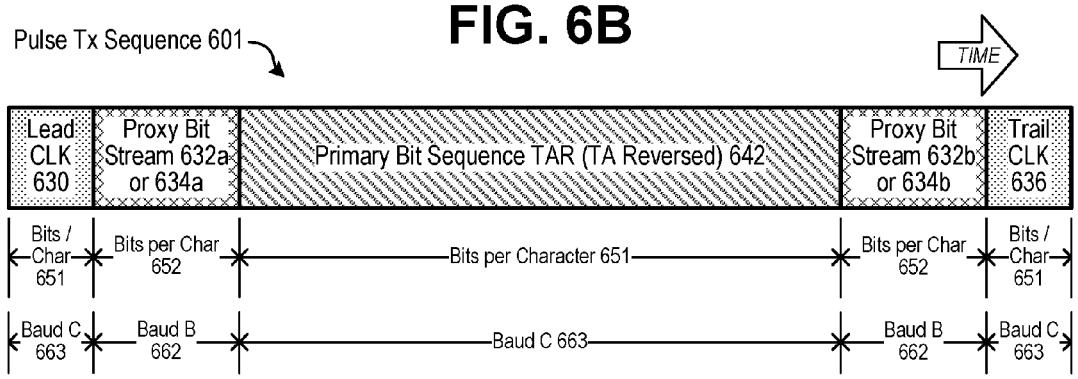

Referring to FIGS. 6A and 6B, the pulse transmission sequences 600 and 601 each comprise (in order) a series of leading clocking bits 630, the proxy bit stream 632*a*/634*a*, the primary channel bit sequence in either forward (TA 641 in FIG. 6A) or reverse order (TAR 642 in FIG. 6B), a second proxy bit stream 632*b*/634*b*, and a series of trailing clocking bits 636. An example of each of the leading clocking bits 630 and the trailing clocking bits 636 would be thirty binary zeros (encoded in the transmitted magnetic pulses). The leading clocking bits 630 and the trailing clocking bits 636 have the same number of bits-per-character 651 as the primary channel bit sequence 641/642, whereas the proxy bit streams 632/634 may have a different number of bits-per-character 652.

The proxy bits streams 632/634 may include customized bit streams or sequences configured to minimize read errors for a particular POS terminal. That is, based on empirical analysis and testing, the bits-per-character and/or number of proxy bits and/or state of proxy bits ("1" or "0") may be selected to improve reading of the pulse transmission sequence by a given POS terminal since POS terminals from different manufacturers, and different POS terminal models from the same manufacturer have different MSR and read head sensitivities. Accordingly, the customized bit stream of proxy bits can be "tuned," i.e. used in a selected configuration to minimize read errors of the pulse transmission sequence.

The leading clocking bits 630 are transmitted at a same bit rate (Baud A 661 in FIG. 6A; Baud C 663 in FIG. 6B) as the primary channel bit sequence 641/642. The leading clocking bits 630 help the MSR and the primary channel decoder synchronize for the bit rate of the primary channel bit sequence 641/642. The bit rate (Baud B 662) of the proxy bit stream is independent of the bit rate 661/663 of the primary channel bit sequence 641/642, and may be the same or different. For example, the bit rate 662 of the proxy bit stream 632/634 may be increased relative to the bit rate 661/663 of the primary channel bit sequence 641/642 to shorten the length of time needed to transmit the proxy bit stream 632/634, as this may increase the likelihood that the primary channel decoder will treat the proxy bit stream 632/634 as noise by shortening the time window used to transmit the proxy bits.

FIG. 6A includes a structural format of the primary channel bit sequence TA 641. The format includes a start sentinel 610, the primary track character sequence 611, an end sentinel 626, and a longitudinal redundancy check (LRC) 628. The bit sequence TA 641 may, for example, correspond to the structure of the bit sequence for Track 2 102 or Track 3 103. Configured for Track 2, the start sentinel 610 corresponds to start sentinel 310, the characters 611 correspond to numeric and control characters 311, the end sentinel 626 corresponds to the end sentinel 326, and the LRC 628 corresponds to the LRC 328. Configured for Track 3, the start sentinel 610 corresponds to start sentinel 410, the characters 611 correspond to numeric and control characters 411, the end sentinel 626 corresponds to the end sentinel 426, and the LRC 628 corresponds to the LRC 428.

Figure 6C:
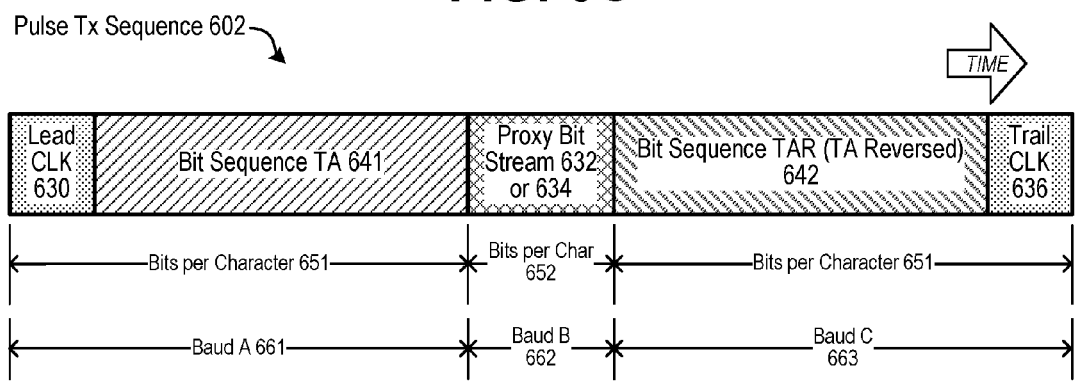
Figure 6D:
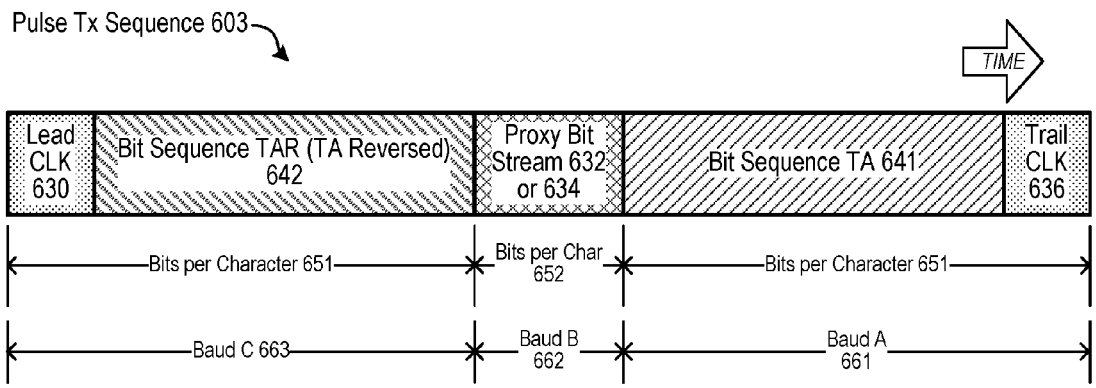

In an alternative configuration, referring to FIGS. 6C and 6D, the pulse sequences 602 and 603 (in order) each comprise a series of leading clocking bits 630, the primary channel bit sequence in either forward (TA 641 in FIG. 6C) or reverse (TAR 642 in FIG. 6D), a proxy bit stream 632/634, the primary channel bit sequence in the opposite order, and a series of trailing clocking bits 636. The forward primary-channel bit sequence TA 641 may have a bit rate (Baud A 661) that is different than the bit rate (Baud C 663) of the reverse primary channel bit sequence TAR 642, although the same bit rate may also be used. Each of the bit rates 661 to 663 is independent of the others.

As illustrated in FIGS. 6A to 6D, if the trailing clocking bits 636 are included in the sequence 600-603, the bit rate may be set to match that of the closest preceding primary channel bit sequence 641/642. The addition of the trailing clocking bits 636 can help the MSR to correctly read the preceding sequence. Additional segments may be included in the sequences 600-603, such as including additional clocking bits between the primary channel bit sequence(s) 641/642 and the proxy bit stream 632/634, with the additional clocking bits having the same character configuration (bit per character 651) and the same bit rate (Baud A 661; Baud C 663) as the primary bit sequence.

Figure 7A:
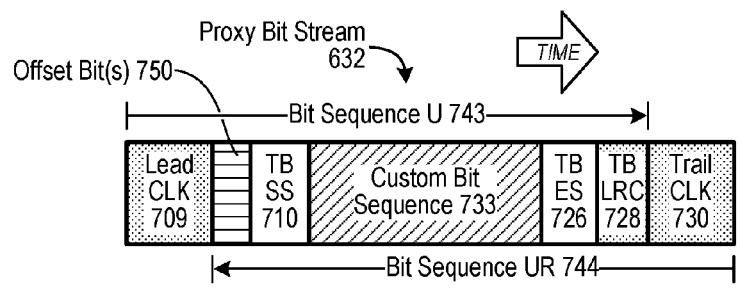
FIGS. 7A and 7B illustrate examples of the proxy bit streams in FIGS. 6A and 6B.

FIG. 7A illustrates an example of a proxy bit stream 632. The proxy bit stream 632 may be configured to include a custom bit sequence 733. The information content of the custom bit sequence 733 may be arbitrary since it is not subject to verification by the transaction processor, but is designed to satisfy the data requirements of the POS terminal. For example, the custom bit sequence 733 may consist of a couple of alphanumeric characters, each having a number of bits-per-character 652 corresponding to the character configuration 114 of the secondary channel. In the alternative, the custom bit sequence 733 may be based on information found in a field in a secondary track of a magnetic stripe 11, such as a characters based on the Name field 218.

To be recognized by the secondary channel decoder of the MSR, the proxy bit stream 632 comprises a bit sequence "U" 743 that includes (in order) a start sentinel character 710, the custom bit sequence 733, an end sentinel character 726, and longitudinal redundancy check (LRC) data bits 728. Lead clocking bits 709 may be included prior to the start sentinel 710. The start sentinel character 710 and the end sentinel character 726 are those of the secondary channel.

The bit sequence "U" 743 may also include offset bit(s) 750 prior to the start sentinel character 710. The offset bit(s) 750 include at least one non-zero bit and has fewer bits than the bits-per-character 651 associated with the primary channel bit sequence 641/642, and fewer bits than the bits-per-character 652 associated with the proxy bit stream 632/634. So, for example, if the sequences include 5-bits per character and 7-bits per character, then there may be one-to-four offset bits 750. The offset bits 750 may either be included in or excluded from the computation of the LRC data bits 728, and do not correspond to a character. The inclusion of the offset bits 750 improves the likelihood that the primary channel decoder will regard the proxy stream as noise.

Figure 7B:
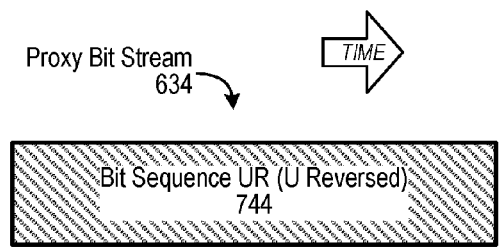

As illustrated in FIG. 7B, the bit sequence U 743 may be reversed to provide bit sequence UR 744 that serves as a proxy bit stream 634. When reversed, a set of trailing clocking bits 730 may be included prior to the reversed LRC at the beginning of the sequence UR 744. Proxy bit streams 632 and 634 are interchangeable, although some POS terminals may be more responsive to one than the other (i.e. one may produce fewer read errors than the other).

The length of proxy bit stream 632/634 depends in part on the noise tolerance of the MSR's primary channel, and the length of the proxy stream in terms of both the number of bits included and the time needed to transmit. The maximum number of bits that can be transmitted in the proxy bit stream 632/634 varies from POS terminal to POS terminal. Further, the custom bit sequence 733 may include fewer bits than the primary track data characters 611 to improve pulse reading accuracy (i.e. lead to fewer read errors), and it may omit at least some of the field information that would ordinarily be required if a track of a magnetic stripe 11 corresponding to the secondary channel were used for transaction approval. In other words, while proxy bit stream 632/634 may mimic some features of a track data structure, data ordinarily required by the corresponding secondary channel standard 112 may be omitted.

The primary channel decoder may recognize the start sentinel 610 and/or the end sentinel 626 based in part on the sentinels each being adjacent to a series of binary zeros (e.g., the leading clocking bits 630 and the trailing clocking bits 636). The proxy bit stream 632 should not include the specific bit sequence corresponding to the start sentinel 610 of the primary bit sequence 641/642 in either the forward or reverse directions. So, for example, if the start sentinel 610 corresponds to a five-bit sequence equal to the character ";" as used with Track 2 102 and Track 3 103, then the proxy bit streams 632 and 634 should not include that five-bit sequence adjacent to binary zeros in either the forward or reverse directions. Similarly, the proxy bit stream 632 also does not include the specific bit sequence corresponding to the end sentinel 626 of the primary bit sequence 641/642 adjacent to binary zeros in either the forward or reverse directions.

Figure 8:
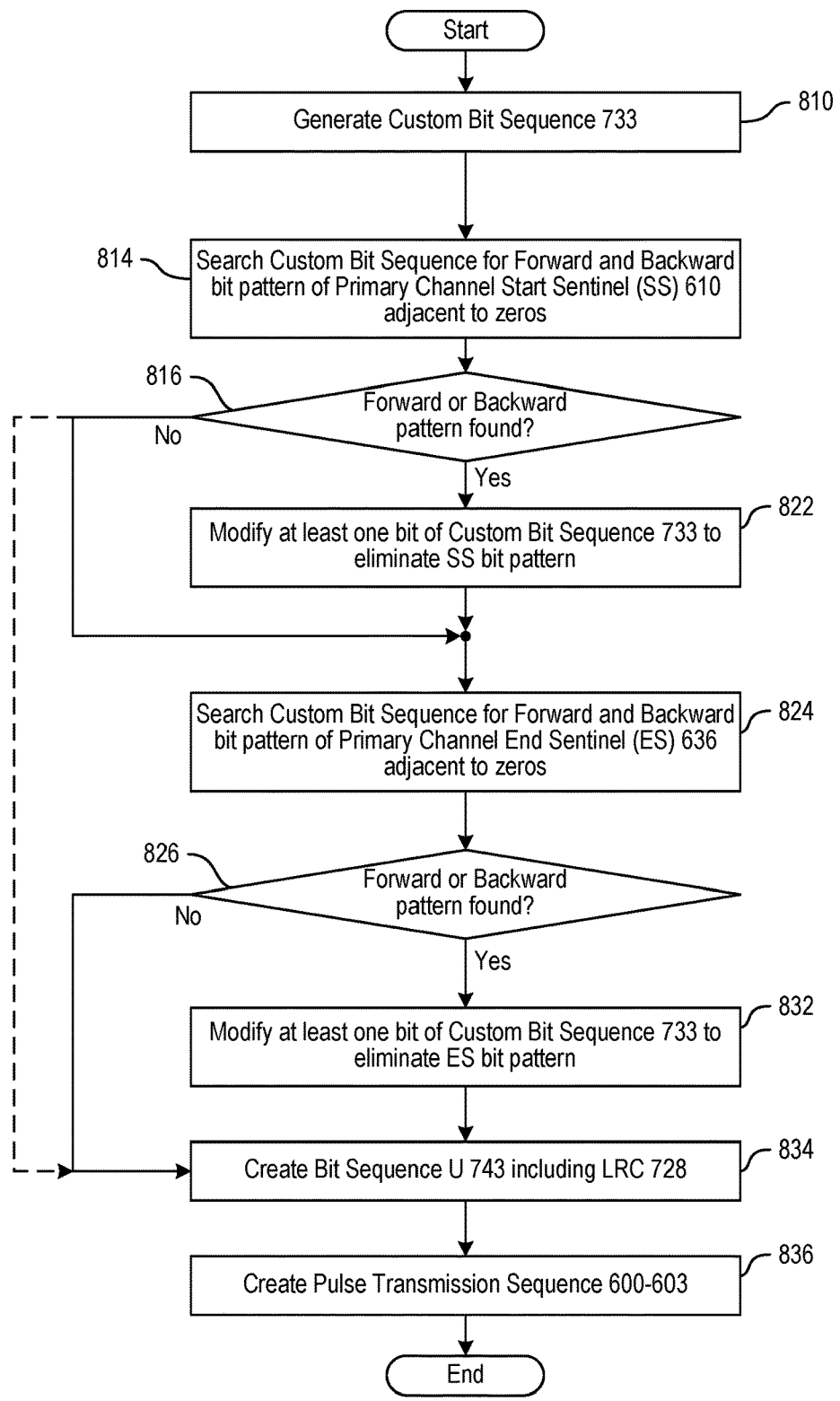
FIG. 8 illustrates a process for constructing the proxy bit streams.

FIG. 8 illustrates an example of a process for assembling a pulse transmission sequence according to the disclosure, including constructing the proxy bit streams 632/634. The process begins by generating (810) a custom bit sequence 733. This may range from generating a random string of bits, to selecting a couple of characters in the information content format 115 of the secondary channel, to selecting information corresponding to a field used with the secondary channel, along with one-or-more control characters (e.g., Field Separators), format-centric code characters (e.g. Format Code 212), and/or placeholder characters that substitute for omitted secondary-channel field information. As described, customized bit sequences may be configured to minimize read errors for a particular POS terminal. The bits-per-character and/or number of proxy bits and/or state of proxy bits ("1" or "0") may be selected to improve reading of the pulse transmission sequence by a given POS terminal since POS terminals from different manufacturers, and different POS terminal models from the same manufacturer, have different MSR and read head sensitivities. Accordingly, the customized bit sequence of the proxy bits can be generated/selected to tune the pulse transmission sequence to minimize read errors for a given POS terminal.

The custom bit sequence 733 is searched (814) for the forward and backward bit patterns of the primary channel start sentinel (SS) 610 adjacent to zeros (e.g., zeros equaling or exceeding a number of bits of one character). If the forward or backward SS bit pattern is found (816 "Yes"), then at least one bit of the custom bit sequence 733 is modified (822) to eliminate the primary channel SS bit pattern.

After modifying (822) the custom bit sequence 733, or if the bit sequence 733 is searched and the primary channel SS bit pattern is not found (816 "No"), then the process may be configured to create (834) the bit sequence U 743. Creating the bit sequence U 743 may include, for example, concatenating the secondary channel start sentinel 710, the custom bit sequence 733, and the secondary channel end sentinel 726, and calculating and appending on the LRC 728. Leading clocking zeros 709, the offset bit(s) 750, and/or the trailing clocking zeros 730 may also be appended. The offset bit(s) 750 may either be included in or excluded from the computation of the LRC 728. An aggregated bit pattern of the pulse transmission sequence 600-603 is created (836) to include the bit sequence U 743 and/or the reverse bit sequence UR 744.

Prior to assembling (834) the bit sequence U 734, the custom bit sequence 733 may also be checked for the primary channel end sentinel (ES) 626 bit pattern adjacent to zeros. If checking for the primary channel ES bit pattern, the custom bit sequence 733 is searched (824) for the forward and backward bit patterns of the primary channel end sentinel (ES) 626 adjacent to zeros (e.g., zeros equaling or exceeding a number of bits of one character). If the forward or backward ES bit pattern is found (826 "Yes"), then at least one bit of the custom bit sequence 733 is modified (834) to eliminate the primary channel ES bit pattern.

Figure 9A:
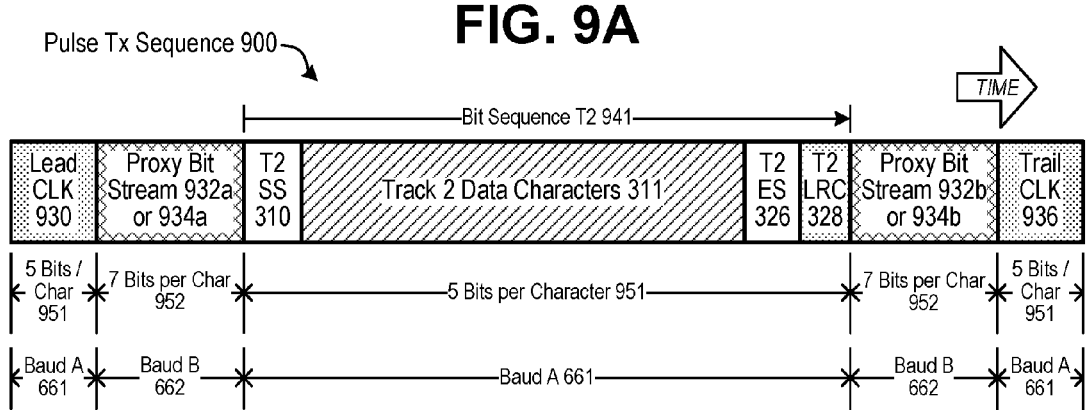
FIGS. 9A and 9B illustrate examples of the frameworks from FIGS. 6A and 6B in which the primary channel corresponds to magnetic-stripe Track 2 channel and the secondary channel corresponds to the Track 1 channel.
Figure 9B:
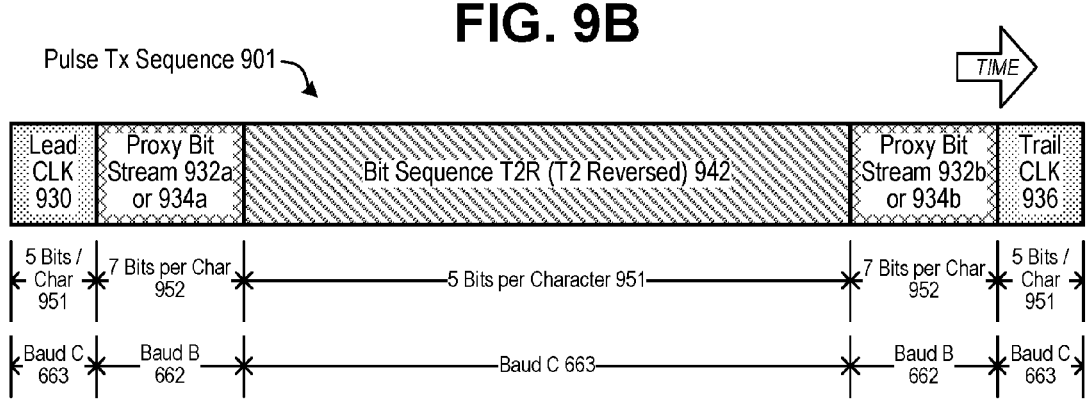

FIGS. 9A and 9B illustrate examples of the frameworks from FIGS. 6A and 6B in which the primary channel corresponds to the Track 2 102 channel and the secondary channel corresponds to the Track 1 101 channel. In these example, the Track 2 "T2" character sequence 311 is the primary channel data 611, with the bit sequence T2 941 corresponding to the Track 2 data structure 102. The proxy bit streams 932 and 934 include some features of the Track 1 data structure 101, but omit data ordinarily required by the IATA standard 112a.

Referring to FIGS. 9A and 9B, alternative pulse transmission sequences 900 and 901 each comprise (in order) a series of leading clocking bits 930, the proxy bit stream 932a/934a, the primary channel bit sequence in either forward (T2 941 in FIG. 9A) or reverse (T2R 942 in FIG. 9B) order, the proxy bit stream 932b/934b, and a series of trailing clocking bits 936. As discussed with the clocking bits 630 and 636, an example of each of the leading clocking bits 930 and the trailing clocking bits 936 would be thirty binary zeros (encoded in the transmitted magnetic pulses). The leading clocking bits 930 and the trailing clocking bits 936 have the same number of bits-per-character 951 as the primary channel bit sequence 941/942 (five bits-per-character), whereas the proxy bit stream 932/934 have a different number of bits-per-character 952 (seven bits-per-character).

As discussed in connection with FIGS. 6A to 6D, the leading clocking bits 930 are transmitted at a same bit rate (Baud A 661 in FIG. 9A; Baud C 663 in FIG. 9B) as the primary channel T2 bit sequence 941/942. The bit rate (Baud B 662) of the proxy bit stream is independent of the bit rate 661/663 of the primary channel bit sequence 941/942, and may be the same or different. Again, the proxy bit stream(s) may include customized bit streams or sequences configured to minimize read errors for a particular POS terminal based on empirical analysis and testing. The bits-per-character and/or number of proxy bits and/or state of proxy bits ("1" or "0") may be selected to improve reading of the pulse transmission sequence by a given POS terminal to tune the pulse transmission sequence to minimize read errors for the given POS terminal.

The structural format of the Track 2 bit sequence T2 941 includes the start sentinel 310, the primary track character sequence 311, the end sentinel 326, and a longitudinal redundancy check (LRC) 328.

Figure 10A:
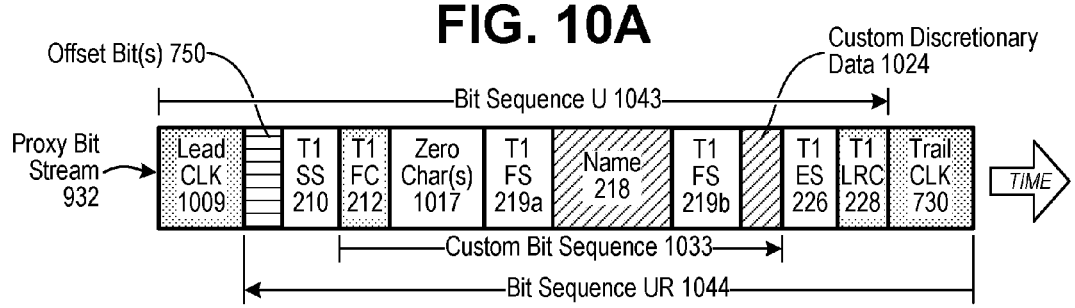
FIGS. 10A and 10B illustrate examples of bit sequences used for the proxy bit stream.
Figure 10B:
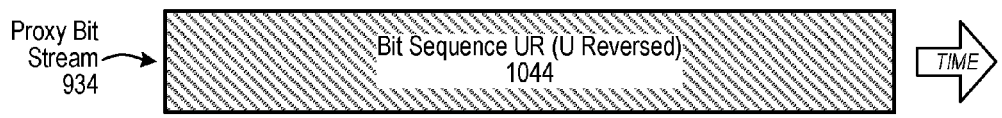

FIGS. 10A and 10B illustrate the proxy bit stream 932/934. The proxy bit stream 932/934 may be configured to include a custom bit sequence 1033, which is an embodiment of the custom bit sequence 733 configured for the Track 1 channel. As discussed in connection with proxy bit streams 632 and 634, the information content of the custom bit sequence 1033 may be arbitrary, since it is not subject to verification by the transaction processor, but is designed to satisfy the data requirements of the POS terminal and minimize read errors of the pulse transmission. For example, the custom bit sequence 1033 may consist of a couple of alphanumeric characters, each having a number of bits-per-character 952 corresponding to the character configuration 114a used with the Track 1 channel. As an alternative, as illustrated in FIG. 10A, the custom bit sequence 1033 may include information based on the Track 1 Name field 218, subject to any bit alterations made to the information contained within the Name field 218 in accordance with the process discussed in connection with FIG. 8.

The proxy bit stream 932 comprises a bit sequence "U" 1043 that includes (in order) a Track 1 start sentinel character 210, the custom bit sequence 1033, a Track 1 end sentinel character 226, and longitudinal redundancy check (LRC) data bits 228. A series of leading clocking bits 1009 (e.g., ten zeros) may be included prior to the start sentinel 210. The custom bit sequence 1033 may comprise (in order) a Format Code character 212, one-or-more arbitrary numeric characters and/or space characters 1017 (e.g. one or two zero characters), a first Field Separator 219a, information based on a Track 1 Name Field 218, a second Field Separator 219b, and a custom discretionary data 1024 consisting of one or more numeric characters and/or space characters (e.g., four zero characters or a four character expiration date). As an alternative to the field 1017 containing arbitrary numeric characters, the field 1017 may contain the last four digits of the PAN data, of one-or-more spaces and zeros followed by the last four digits of the PAN data.

In accordance with the process in FIG. 8, even if the characters used for the Format Code 212, Name field 218, last four PAN digits, and/or the expiration date are initially set to actual values associated with a customer's account, the information may be altered to eliminate occurrence of the forward and backward bit patterns corresponding to the Track 2 Start Sentinel 310 and End Sentinel 326. Although the Name field 218 may include the entirety of the Name field information associated with a customer's account, the Name field information may be shortened or abbreviated, or substitute information may be used, so as to reduce the length of the custom bit sequence 1033. The offset bit(s) 750 may be included between the leading clocking bits 1009 the start sentinel 210. The offset bits 750 may either be included in or excluded from the computation of the LRC data bits 228, and do not correspond to a character.

The included information based on the Format Code 212, Name field 218, last four PAN digits and/or expiration date are not used to validate the transaction, but instead are used to satisfy requirements of software used by the merchant's payment processing system (e.g., software within the POS terminal), which may check for the presence of the information and/or make record of the information. Transaction approval by the transaction processor (e.g., 1680 in FIG. 16) remains dependent upon the portion of the pulse sequence corresponding to the Track 2 sequence. Satisfying the data field requirements of the merchant's payment processing software improves the likelihood that the POS terminal will accept and validate the transaction based on the Track 2 data.

As illustrated in FIG. 10B, the bit sequence U 1043 may be reversed to provide bit sequence UR 1044 that serves as a proxy bit stream 934. When reversed, a set of trailing clocking bits 730 may be included prior to the reversed LRC at the beginning of the sequence UR 1044. Proxy bit streams 932 and 934 are interchangeable, although some POS terminals may be more responsive to one than the other.

Figure 11A:
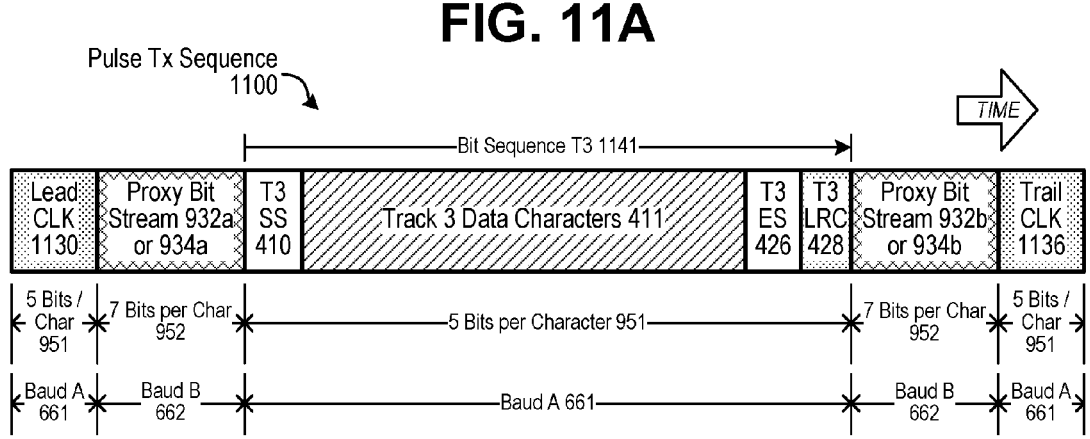
FIGS. 11A and 11B illustrate examples of the frameworks from FIGS. 6A and 6B in which the primary channel corresponds to magnetic-stripe Track 3 data and the secondary channel corresponds to Track 1.
Figure 11B:
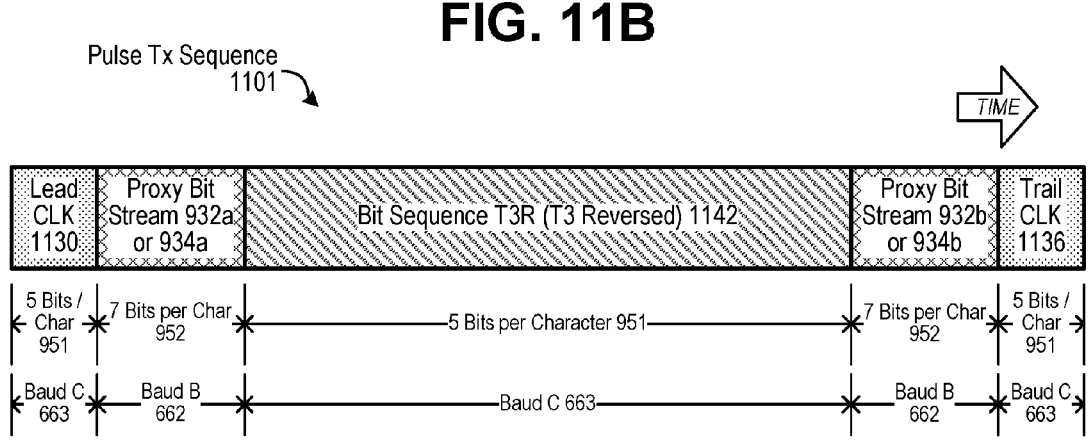

FIGS. 11A and 11B illustrate examples of the frameworks from FIGS. 6A and 6B in which the primary channel corresponds to the Track 3 103 channel and the secondary channel corresponds to the Track 1 101 channel. In these example, the Track 3 "T3" character sequence 411 is the primary channel data 611, with the bit sequence T3 1141 corresponding to the Track 3 data structure 103. The proxy bit streams 932 and 934 include some features of the Track 1 data structure 101, but omit data ordinarily required by the IATA standard 112a.

Referring to FIGS. 11A and 11B, the pulse transmission sequences 1100 and 1101 each comprise (in order) a series of leading clocking bits 1130, the proxy bit stream 932a/934a, the primary channel bit sequence in either forward (T3 1141 in FIG. 11A) or reverse (T3R 1142 in FIG. 11B) order, the proxy bit stream 932b/934b, and a series of trailing clocking bits 1136. As discussed with the clocking bits 630 and 636, an example of each of the leading clocking bits 1130 and the trailing clocking bits 1136 would be thirty binary zeros (encoded in the transmitted magnetic pulses). The leading clocking bits 1130 and the trailing clocking bits 1136 have the same number of bits-per-character 951 as the primary channel bit sequence 1141/1142 (five bits-per-character), whereas the proxy bit stream 932/934 may have a different number of bits-per-character 952 (e.g., seven bits-per-character).

As discussed in connection with FIGS. 6A to 6D, the leading clocking bits 1130 are transmitted at a same bit rate (Baud A 661 in FIG. 11A; Baud C 663 in FIG. 11B) as the primary channel T3 bit sequence 1141/1142. The bit rate (Baud B 662) of the proxy bit stream is independent of the bit rate 661/663 of the primary channel bit sequence 1141/1142, and may be the same or different. The structural format of the Track 3 bit sequence T3 1141 includes the start sentinel 410, the primary track character sequence 411, the end sentinel 426, and a longitudinal redundancy check (LRC) 428.

FIGS. 12A to 12H illustrate embodiments of the improved pulse sequence transmissions based on the frameworks in FIGS. 9A and 9B in which the primary channel corresponds to Track 2 and the secondary channel corresponds to Track 1. Although not illustrated, Track 3 may be substituted for Track 2 in the pulse sequences in FIGS. 12A to 12H (in accordance with the frameworks in FIGS. 11A and 11B).

FIG. 12A illustrates a pulse sequence "T2U" 1200, comprising leading clocking bits 930, the T2 bit sequence 941, the bit sequence U 1043, and the trailing clocking bits 936. FIG. 12B illustrates a pulse sequence "T2RU" 1201, which is the same as sequence 1200 but uses the T2R bit sequence 942 as the primary channel sequence.

FIG. 12C illustrates a pulse sequence "T2UR" 1202, comprising leading clocking bits 930, the T2 bit sequence 941, the bit sequence UR 1044, and the trailing clocking bits 936. FIG. 12D illustrates a pulse sequence "T2RUR" 1203, which is the same as sequence 1202 but uses the T2R bit sequence 942 as the primary channel sequence.

Figure 12E:
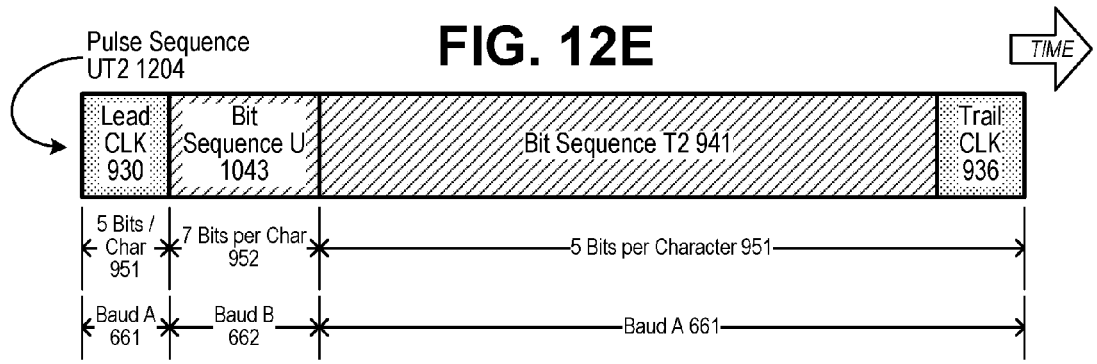
Figure 12F:
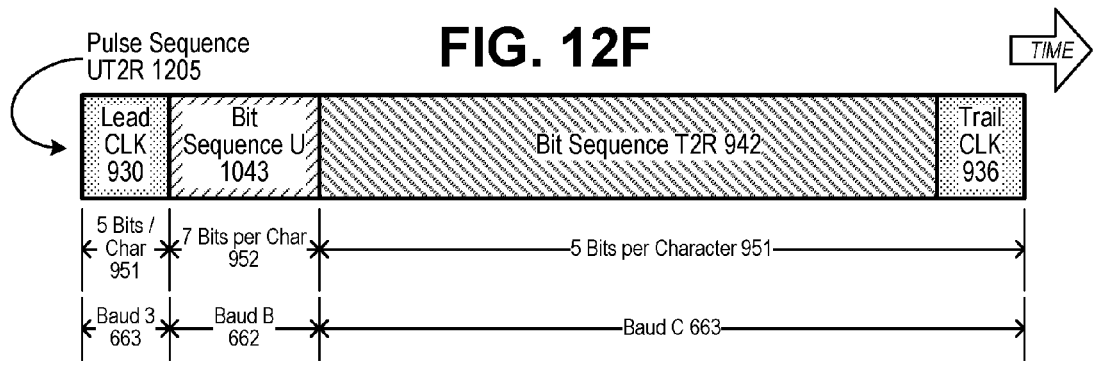

FIG. 12E illustrates a pulse sequence "UT2" 1204, comprising leading clocking bits 930, the bit sequence U 1043, the T2 bit sequence 941, and the trailing clocking bits 936. FIG. 12F illustrates a pulse sequence "UT2R" 1205, which is the same as sequence 1204 but uses the T2R bit sequence 942 as the primary channel sequence.

Figure 12G:
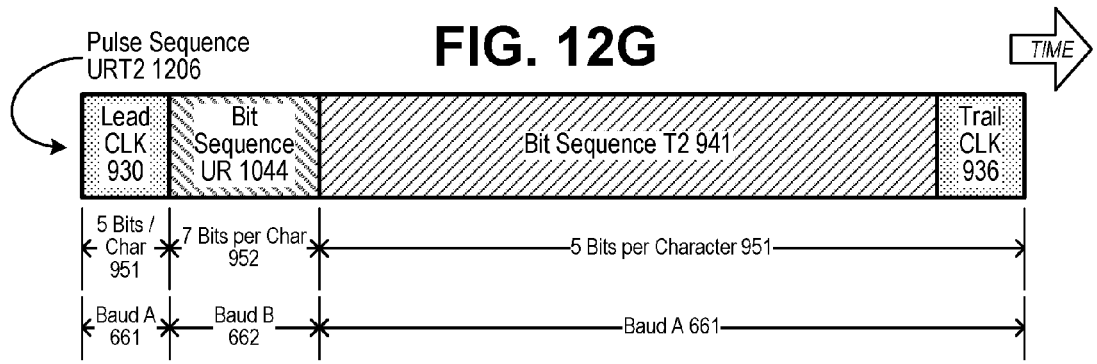
Figure 12H:
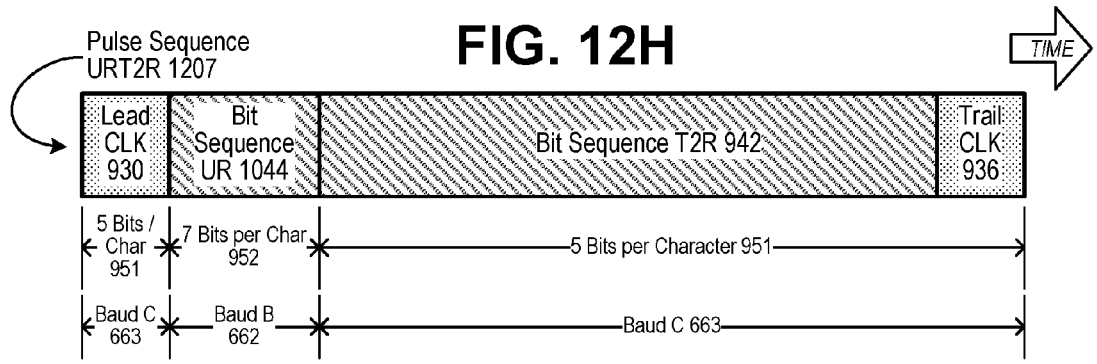

FIG. 12G illustrates a pulse sequence "URT2" 1206, comprising leading clocking bits 930, the bit sequence UR 1044, the T2 bit sequence 941, and the trailing clocking bits 936. FIG. 12H illustrates a pulse sequence "URT2R" 1207, which is the same as sequence 1206 but uses the T2R bit sequence 942 as the primary channel sequence.

FIGS. 13A to 13D illustrate embodiments of the improved pulse sequence transmissions based on the frameworks in FIGS. 6C and 6D in which the primary channel corresponds to Track 2 and the secondary channel corresponds to Track 1. Although not illustrated, Track 3 may be substituted for Track 2 in the pulse sequences in FIGS. 13A to 13D.

FIG. 13A illustrates a pulse sequence "T2UT2R" 1300, comprising leading clocking bits 930, the T2 bit sequence 941, the bit sequence U 1043, the T2R bit sequence 942, and the trailing clocking bits 936. FIG. 13B illustrates a pulse sequence "T2URT2R" 1301, which is the same as sequence 1300 but uses the UR bit sequence 1044 as the as the secondary channel proxy bit stream.

FIG. 13C illustrates a pulse sequence "T2RUT2" 1302, comprising leading clocking bits 930, the T2R bit sequence 942, the bit sequence U 1043, the T2 bit sequence 941, and the trailing clocking bits 936. FIG. 13D illustrates a pulse sequence "T2RURT2" 1303, which is the same as sequence 1302 but uses the UR bit sequence 1044 as the as the secondary channel proxy bit stream.

As noted above, Baud A 661, Baud B 662, and Baud C 663 are each independent. Preferably, each of Baud A 661, Baud B 662, and Baud C 663 have a bit rate between eighty (80) and eight hundred (800) bits-per-second. As an example, referring to the pulse sequence T2U 1200 in FIG.

12A, Baud A 661 might be one hundred (100) bits-per-second, whereas Baud B 662 might be two hundred (200) bits-per-second. As another example, referring to the pulse sequence T2UT2R 1300 in FIG. 13A, Baud A 661 might be eighty (80) bits-per-second, whereas Baud B 662 might be one hundred (100) bits-per-second, and Baud C 663 might be two-hundred (200) bits-per-second. The transitions between baud rates may be smooth and gradual, or may be abrupt. When a smooth transition is provided between baud rates, additional zeroes may be included within the sequences to facilitate a smooth transition between rates (e.g., between the proxy bit stream and the primary channel sequence).

Figure 14A:
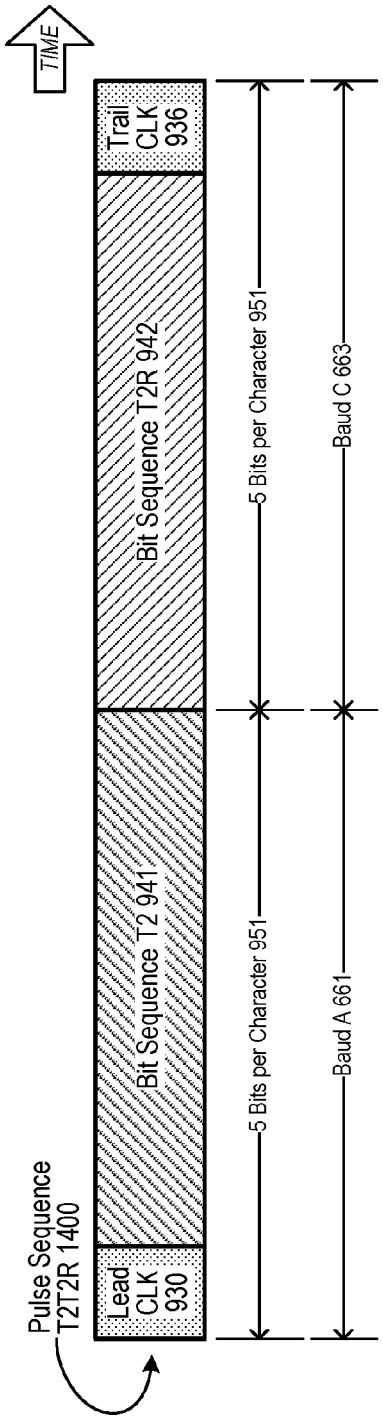
FIGS. 14A and 14B illustrate embodiments of the improved pulse sequence transmissions based on the frameworks in FIGS. 6C and 6D in which the primary channel corresponds to Track 2 and the secondary channel data is omitted.
Figure 14B:
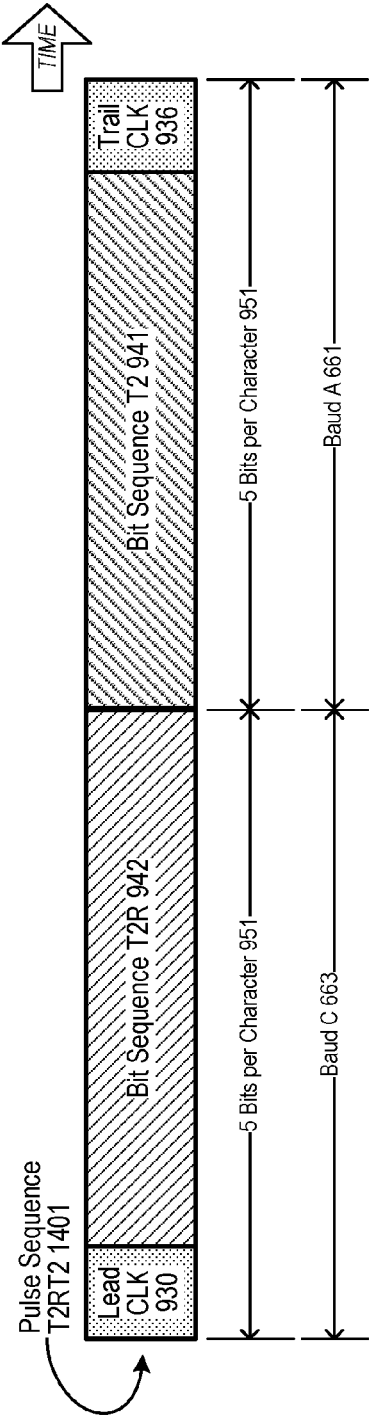

FIGS. 14A and 14B illustrate embodiments of a framework for improved pulse sequence transmissions based on the frameworks in FIGS. 6C and 6D in which the primary channel corresponds to Track 2 and the secondary channel data is omitted. FIG. 14A illustrates a pulse sequence "T2T2R" 1400, comprising leading clocking bits 930, the T2 bit sequence 941, the T2R bit sequence 942, and the trailing clocking bits 936. FIG. 14B illustrates a pulse sequence "T2RT2" 1401, comprising leading clocking bits 930, the T2R bit sequence 942, the T2 bit sequence 941, and the trailing clocking bits 936. Tested examples of Baud A 661 and Baud C 663 with the embodiments in FIGS. 14A and 14B include T2 at 100 bits-per-second and T2R at 300 bits-per-second, and T2 at 300 bits-per-second and T2R at 200 bits-per-second.

Figure 15:
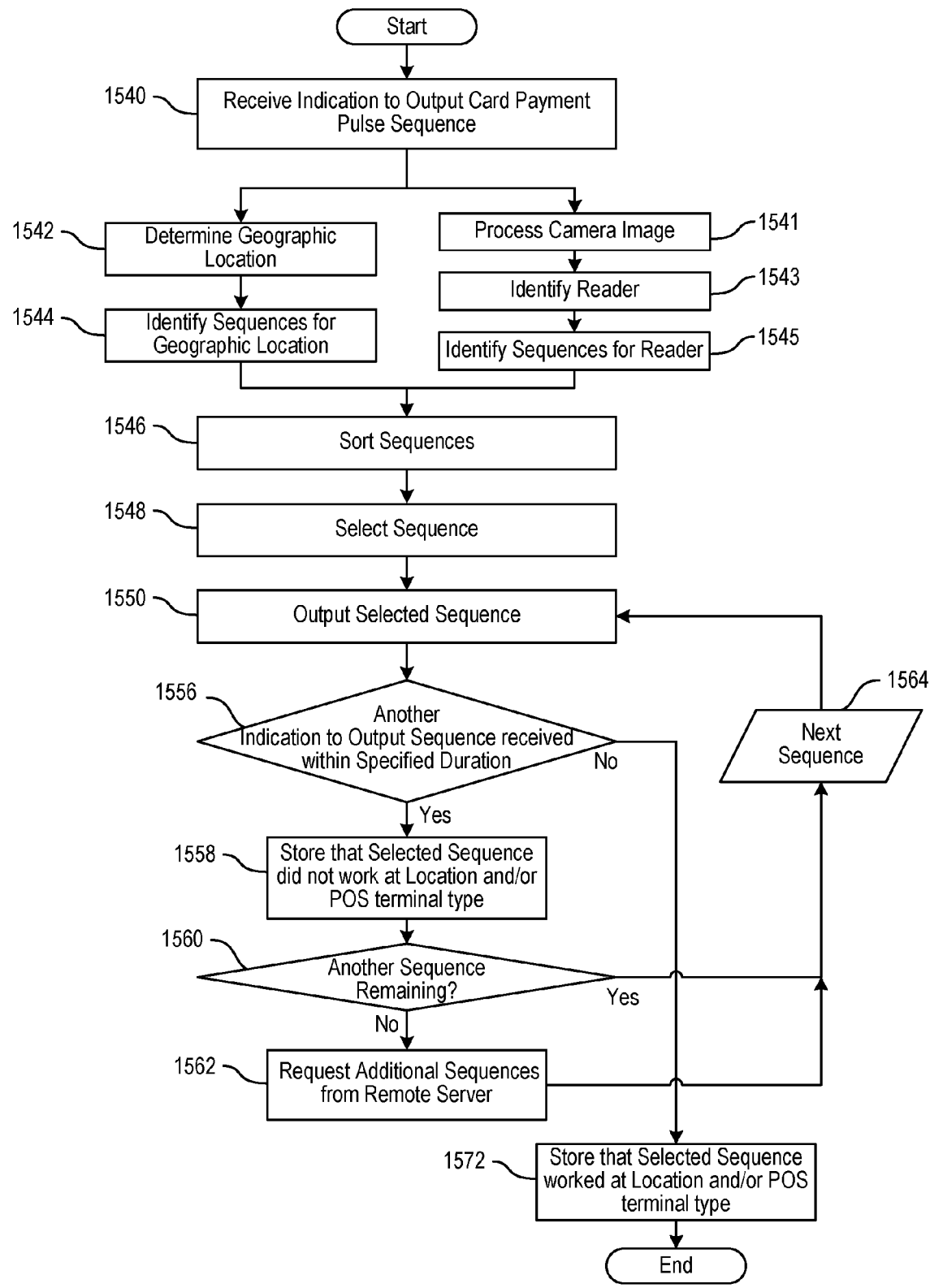
FIG. 15 illustrates a process used by a device to determine which of the improved pulse sequences to use.

FIG. 15 illustrates a process used by a device to selectively determine which of the improved pulse sequences to use. The process begins with software on a contactless payment device receiving (1540) an indication to output a card payment pulse sequence. An example of receiving the indication is detecting a "touch" of a region of a graphical user interface (GUI) on touch-sensitive display that corresponds to a "pay" button.

The contactless payment device determines (1542) its geographic location. Any technique may be used to acquire location information, such as using information from satellite geographic positioning system receiver such as a Global Positioning System (GPS) receiver and/or a Global Navigation Satellite System (GLONASS) receiver. Other examples of how location information may be acquired include using other radio sources (e.g., via at least one antenna), such as mapping services that triangulate off of known WiFi service set identifiers (SSIDs) or cellular towers within range of the device.

The device may contain a default list of pulse transmission sequences. Using information stored on the device and/or by accessing a database over a wireless network, the device identifies (1544) which of the pulse transmission sequences have been determined to work and which have been determined not to work with POS terminals at the location, and/or within a geographic region (e.g., a country), as certain manufacturers and types of POS terminals are known to predominate in certain geographic regions/countries. Each sequence and bit-rate combination may be associated with a weighted score corresponding to a confidence level that the sequence will or will not work at a specific location and/or within a specific region.

Either in combination with geographic-location based sequence identification (1542/1544), or as another approach to identifying sequences, image processing may be used to identify physically distinctive types of POS terminals. For example, the "Square" mag-reader dongle made by Square, Incorporated, has a distinctive shape that is identifiable using conventional image pattern recognition. In addition, some POS terminals have distinctively shaped features such as the shape of the pin/keypad.

The device processes (1541) an image captured by a camera of the device to identify patterns in the captured image (or images). The device then identifies (1543) whether any of the identified patterns corresponds to that of a specific type of POS terminal. Using information stored on the device and/or by accessing a database over a wireless network, the device identifies (1545) which of the pulse transmission sequences have been determined to work for the identified POS terminal (if the device is able to identified a specific terminal). Each sequence and bit-rate combination may be associated with a weighted score corresponding to a confidence level that the sequence will or will not work with the specific terminal.

The device sorts (1546) the default list using rules. The sort may give sequences that are indicated as working at the specific geographic location and/or with a specific identified terminal the highest priority. Sequences indicated as working within the region (e.g., a country), but untested at the specific location and/or with the specific identified terminal, may be given next-highest priority. Sequences known not to work at the specific geographic location and in the regions and/or with the specific identified terminal may be given lowest priority. Among sequences given the lowest priority, if the associated confidence score exceeds a stored threshold value indicating that it is highly improbably that the sequence would work, the sequence may be culled from the sorted list. Sequences indicated as working within the geographic region, but not at the specific geographic location and/or with the specific identified terminal, may be given next-to-last priority.

Other sequences may retain their default ordering in the list if they have not been tested. The default ordering may be based on, among other things, each sequence's "success" rate in other geographic regions or overall. The list of candidate pulse transmission sequences and bit-rate combinations, their default ordering, and the individual or combined weighted scores indicating which sequences do and do not work at the location and within the region and/or with a specific device may be reconciled between the contactless payment device and a database on a remote server, either as part of the transaction process or as part of occasional updates.

The sequences in the list may vary in structure (as discussed in connection with FIGS. 6A to 7B, and 9A to 14B). The same sequence framework may be identified more than once, such as including occurrences of a same sequence at different bit-rate combinations, and/or using a same framework but with different structures of the custom bit sequences 733/1033 for the proxy bit streams.

Based on the ordered priority, the contactless payment device selects (1548) a sequence, and outputs (1550) the sequence as a series of magnetic pulses. Ideally, the POS terminal properly receives the sequence and the transaction is approved. However, if the device receives (1556 "Yes") another indication to output a sequence within a specified duration (e.g., thirty seconds), the assumption is made that the transaction was not approved and the device user wishes to try again. The contactless payment device stores (1558) that the selected sequence did not work at the location and/or POS terminal type (updating the sequence's weighted score(s)), and if another sequence remains in the sorted list (1560 "Yes"), selects (1564) and outputs (1550) a next sequence in the list to try again. If a sequence in the list has a weighted score above a threshold value, so as to indicate that it is highly probably that the sequence should work at the location, the contactless payment device may try outputting that sequence more than once before selecting another.

If the contactless payment device runs out of sequences to try (1560 "No"), there are several options available, depending upon how the device is configured. For example, contactless payment device may retry a sequence at the top of the sorted list, but using a different bit-rate combination, such as repeating the top scoring sequence at a slower bit-rate. As another example, the device may loop back to the top of stored list and reuse the framework of the top scoring sequence with a different proxy bit stream, such as trying a shorter custom bit sequence 733/1033 (e.g., by subtracting characters from the name field 218, rerunning the process in FIG. 8 and/or changing the number of offset bit(s) 750, and trying again). As another example, the contactless payment device may request (1562) additional sequence frameworks from a remote server. As a last resort, the contactless payment device may output an error indication for the benefit device's user.

If the device does not receive (1556 "No") another indication to output a sequence within a specified duration (e.g., thirty seconds), the assumption is made that the transaction was approved. The contactless payment device stores (1572) that the selected sequence did work at the location and/or with the identified POS terminal type (updating the sequence's weighted score(s)). The time and date of the transaction may also be logged by the device, so as to allow a later comparison of the transaction with transactions approved by a transaction processor, so as to validate the improved confidence value (i.e., the weighted score) associated with the sequence and bit-rate combination.

Figure 16:
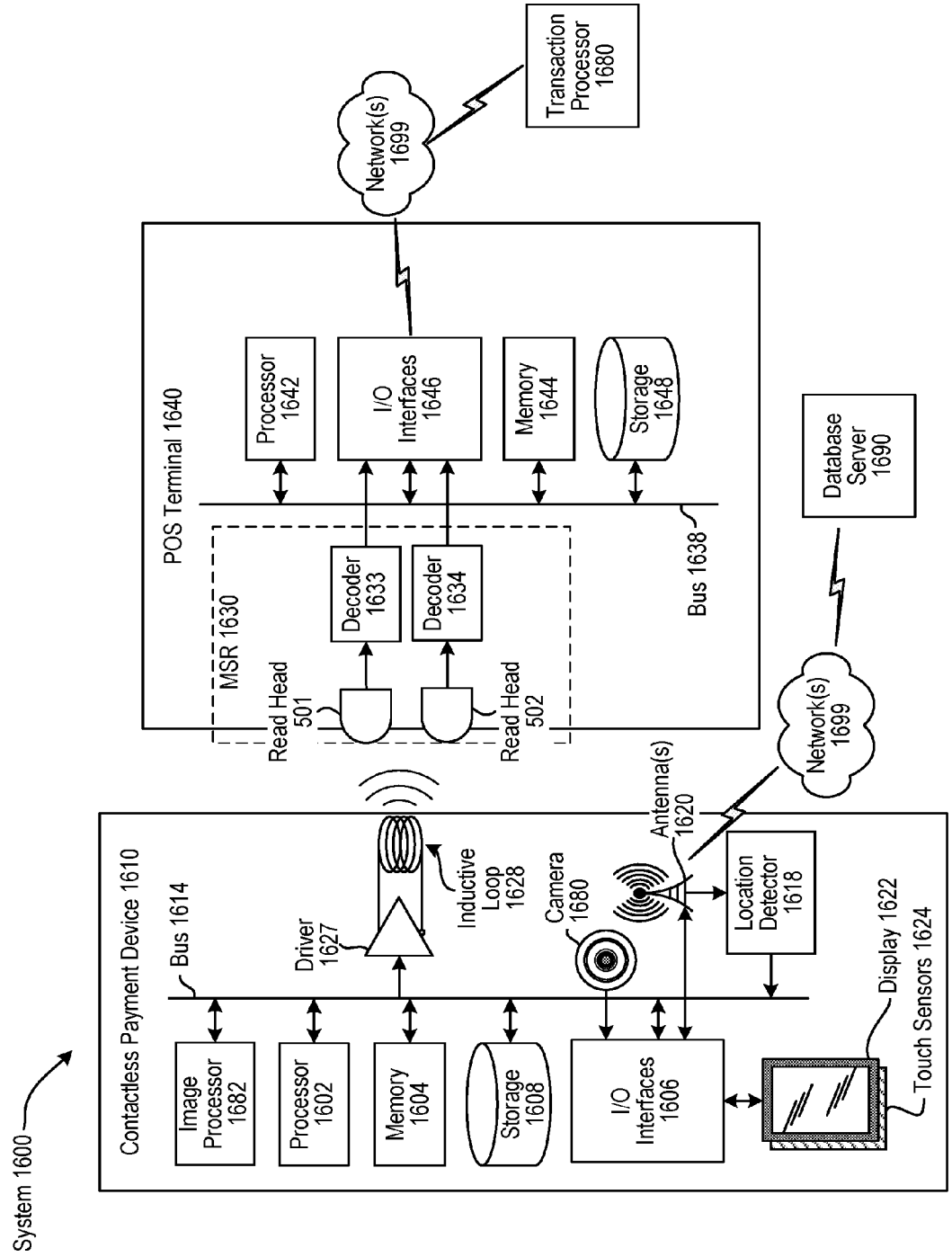
FIG. 16 is a block diagram conceptually illustrating example components in a system including the device that generates the improved pulse sequence transmission.

FIG. 16 is a block diagram illustrating example components in a system 1600 including an improved contactless payment device 1610 according to the disclosure. A processor 1602 on the device 1610 executes instructions to perform the processes and output the improved pulse sequence transmissions discussed in connection with FIGS. 6A to 15.

The device 1610 includes one or more processors 1602, that each include a central processing unit (CPU) for processing data and executing instructions, and a memory 1604 for storing the data and the instructions. The memory 1604 may include volatile random access memory (RAM) and/or other types of memory. The device 1610 also includes a data storage component 1608, for storing the data and the processor-executable instructions. The data storage component 1608 may include one or more non-volatile storage types such as read only memory (ROM), flash memory, phase-change memory, Ferroelectric RAM, etc. The device 1610 may also be connected to removable or external non-volatile memory and/or storage, such as a removable memory card, a USB "thumb" drive, networked "cloud" storage, etc., through input/output (I/O) interfaces 1606.

The processor-executable instructions that configure the device 1610 and its various components are executed by the processor(s) 1602, using the memory 1604 as temporary "working" storage at runtime. The processor-executable instructions may be stored in the non-volatile memory 1604, the storage component 1608, and/or an external device. Some of the instructions may be embedded in hardware or firmware in addition to or instead of software.

The I/O interfaces 1606 may include interfaces for an external peripheral device connection such as universal serial bus (USB), as well as interfaces for wireless local area network (such as WiFi), Bluetooth, and/or cellular network (such as Long Term Evolution (LTE)) connectivity via the antenna(s) 1620. The I/O interfaces 1606 may also provide interfaces to a display 1622 including touch sensors 1624, and to one or more cameras 1680.

The antenna(s) may also be used by a location detector 1618, which may include one or more specialized radio receivers, such as a GPS receiver or GLONASS receiver. Instructions executed by the processor(s) 1602 may determine (1542) the device's geographic location based on location information determined by the location detector 1618.

The device 1610 may also include an image processor 1682, either as a component (e.g., a digital signal processor), or as instructions stored in storage 1608 that configure the processor 1602 to perform image processing. The image processor 1682 processes (1541) images captured by the one or more cameras 1680 to perform the pattern recognition used to identify (1543) POS terminals that are recognizable based on distinctive physical features/shape.

In addition, the image processor 1682 may be used to identify the location of the POS terminal's MSR 1630 based on pattern recognition. Instructions stored in storage 1608 may be used to configure the processor 1602 to cause the display of information on the display 1622 instructing a user how to position the device 1610 relative to the MSR 1630 to improve the likelihood that the POS terminal 1640 will correctly receive the magnetic pulse sequence when it is emitted via the inductive loop 1628. The instructions may be in the form, for example, of an augmented reality interface that displays the live image of the MSR 1630 as captured by the camera 1680 on the display 1622, together with an overlay indicating whether the user should move the device up, down, closer, further, etc. from the MSR 1630.

The device 1610 may include an address/data bus 1614 for conveying data among components of the device 1610. Each component within the device 1610 may also be directly connected to other components in addition to (or instead of) being connected to other components across the bus 1614.

The list of pulse transmission sequences described hereinbefore may be stored in memory 1604 and/or storage component 1608, and updated/reconciled against data stored on a database server 1690, reached via a connection over one-or-more networks 1699. To output (1550) a pulse transmission sequence, a driver 1627 receives a bit sequence from the processor 1602, and converts the bit sequence into a time-modulated alternating current which is applied to an inductive loop 1628. The application of the alternating current to the loop 1628 generates the pulse transmission sequence as a series of magnetic field pulses.

An illustrative POS terminal 1640, such as may work in conjunction with the contactless payment device 1610, includes an MSR 1630. The MSR includes the read heads 501 and 502 that receive the magnetic field pulses. The first channel read head 501 outputs a signal to a first channel decoder 1633. The second channel read head 502 outputs a signal to a primary channel decoder 1634. It should be appreciated that other components may be implemented in various configurations in different models by different manufacturers of POS terminals. The MSR 1630 may be integrated with the POS terminal 1640, or may be separate. The MSR 1630 may communicate with components of the POS terminal 1640 via input/output (I/O) interfaces 1646.

The POS terminal 1640 includes one or more processors 1642, that each include a central processing unit (CPU) for processing data and executing instructions, and a memory 1644 for storing the data and the instructions. The memory 1644 may include volatile random access memory (RAM) and/or other types of memory. The POS terminal 1640 also includes a data storage component 1648, for storing the data and the processor-executable instructions. The data storage component 1648 may include one or more non-volatile storage types such as read only memory (ROM), flash memory, a hard disk drive (HDD), etc. The POS terminal 1640 may also be connected to removable or external non-volatile memory and/or storage, such as a USB "thumb" drive, an optical disc drive, networked "cloud" storage, etc., through the I/O interfaces 1646.

The processor-executable instructions that configure the POS terminal 1640 and its various components are executed by the processor(s) 1642, using the memory 1644 as temporary "working" storage at runtime. The processor-executable instructions may be stored in the non-volatile memory 1644, the storage component 1648, and/or an external device. Some of the instructions may be embedded in hardware or firmware in addition to or instead of software. Some or all of the functionality of the channel decoders 1633 and 1634 may be performed by the processor(s) 1642 instead of or in conjunction with dedicated decoder circuitry within the MSR 1630.

The POS terminal 1640 may include an address/data bus 1638 for conveying data among components of the terminal 1640. Each component within the POS terminal 1640 may also be directly connected to other components in addition to (or instead of) being connected to other components across the bus 1638.

The POS terminal 1640 may use an input/output (I/O) interface 1646 to communicate with a transaction processor 1680 via network(s) 1699. Instructions executed by the processor(s) 1642 receive the decoded pulse information from the MSR 1630, extract the information needed for transaction approval, and forward at least a portion of the extracted information to the transaction processor 1680. The transaction processor 1680 sends back information indicating whether the transaction is approved or denied. The POS terminal 1640 may output an indication of whether the transaction approved or denied, such as outputting a message via a display (not illustrated), by activating an indicator, by outputting a sound, etc.

Although mentioned in the Background, but not discussed in detail in connection with the improved pulse transmission sequences, a portion of the content of the primary channel sequence may be dynamic. So, for example, referring to FIG. 15, each time a selected sequence is output (1550) by the device 1610, a portion of the primary channel bit sequence (e.g., 641, 642, 941, 942, 1141, 1142) may be altered for security purposes.

Also, in addition to working with contactless systems, the improved pulse sequences may also be used with any of the cards that can be swiped through an MSR. For example, the improved sequences may be used with electronics cards that use a series of MEMS coil arrays embedded in the card to mimic the domains of a magnetic stripe. The improved sequences could also be encoded into a magnetic stripe that contains a single wide track (e.g., a single track spanning the width of Track 1 101 and Track 2 102, spanning the width of Track 1 101 through Track 3 103, or spanning the width of Tracks 2 102 and Track 3 103), so that a single track is configured to convey information to multiple MSR read heads.

As discussed in connection with FIGS. 8, 15, and 16, processes performed by the contactless payment device 1610 may be implemented by one-or-more processors 1602 contained within devices, and/or by other devices across a distributed environment (e.g., database server 1690). Processor-executable instructions that configure the processors to assemble (FIG. 8) and output (FIG. 15) the improved pulse transmission sequences may be implemented as an article of manufacture such as a memory device or a non-transitory computer readable storage medium. The computer readable storage medium may be, for example, a non-volatile computer memory, a hard drive, a solid-state drive (SSD), a flash memory drive, removable disk and/or other media.

The example frameworks and detailed embodiments of contactless payment system disclosed herein are intended to teach the principles of how to create the improved pulse transmission sequences to one of ordinary skill, rather than to be exhaustive. Many modifications and variations may be apparent to those of skill in the art, such as changing the order of process steps, while still achieving the benefits and advantages of the improved system. Moreover, aspects of the system may be practiced without some or all of the specific details and steps disclosed herein.

As used in this disclosure, the term "a" may include one or more items unless specifically stated otherwise. Further, the phrase "based on" is intended to mean "based at least in part on" unless specifically stated otherwise.

What is claimed is:

1. A contactless electronic payment method, comprising:
generating, by an electronic device, a first bit sequence in accordance with a first format of a first track of a magnetic stripe card, the first bit sequence encoding first information required by the first format;
generating, by the electronic device, a second bit sequence based on a second format of a second track of the magnetic stripe card, the second bit sequence omitting at least some second information required by the second format;
replacing, by the electronic device, the at least some second information omitted from the second bit sequence with a custom bit sequence;
concatenating, by the electronic device, the first bit sequence in forward or reverse bit-order with the second bit sequence, including the custom bit sequence, in forward or reverse bit-order to form a third bit sequence; and
transmitting, by the electronic device, the third bit sequence from the electronic device as a series of magnetic-field pulses to electronically simulate a swiping of the magnetic stripe card across read heads of a magnetic stripe reader (MSR),
wherein the custom bit sequence is configured to improve acceptance of the first bit sequence transmitted within the third bit sequence by a point-of-sale (POS) terminal.

2. The contactless electronic payment method of claim 1, wherein the second bit sequence includes cardholder name information.

3. The contactless electronic payment method of claim 1, wherein the first bit sequence includes start bits representing a start character, the start character specified by the first format to indicate a start of the first track, and
wherein generating the second bit sequence comprises changing one or more bits within the second bit sequence to eliminate occurrence of the start bits in forward or reverse bit-order.

4. The contactless electronic payment method of claim 1, wherein the first bit sequence includes end bits representing an end character, the end character specified by the first format to indicate an end of the first track, and
wherein generating the second bit sequence comprises changing one or more bits within the second bit sequence to eliminate occurrence of the end bits in forward or reverse bit-order.

5. The contactless electronic payment method of claim 1, wherein the transmitting of the series of magnetic-field pulses comprises:
   transmitting pulses corresponding to the first bit sequence at a first bit rate, and
   transmitting pulses corresponding to the second bit sequence at a second bit rate, and
   wherein the first and second bit rates being different.

6. The contactless electronic payment method of claim 1, wherein the third bit sequence includes the first bit sequence in both forward and reverse bit-order.

7. The contactless electronic payment method of claim 6, wherein the transmitting of the series of magnetic-field pulses comprises:
   transmitting pulses corresponding to the first bit sequence in forward bit-order at a first bit rate,
   transmitting pulses corresponding to the second bit sequence in forward or reverse bit-order at a second bit rate, and
   transmitting pulses corresponding to the first bit sequence in reverse bit-order at a third bit rate, and
   wherein the first, second, and third bit rates being different.

8. The contactless electronic payment method of claim 1, the method further comprising:
   determining, by the electronic device, a location of the electronic device; and
   determining, by the electronic device, a structure of the third bit sequence based on the location, wherein the concatenating arranges the first bit sequence and the second bit sequence in accordance with the structure.

9. A non-transitory computer-readable storage medium storing processor-executable instructions to configure an electronic device to make a contactless payment, comprising instructions to:
   generate, by the electronic device, a first bit sequence in accordance with a first format of a first track of a magnetic stripe card, the first bit sequence encoding first information required by the first format;
   generate, by the electronic device, a second bit sequence based on a second format of a second track of the magnetic stripe card, the second bit sequence omitting at least some second information required by the second format;
   replacing, by the electronic device, the at least some second information omitted from the second bit sequence with a custom bit sequence;
   concatenate, by the electronic device, the first bit sequence in forward or reverse bit-order with the second bit sequence, including the custom bit sequence, in forward or reverse bit-order to form a third bit sequence; and
   transmit, by the electronic device, the third bit sequence from the electronic device as a series of magnetic-field pulses to electronically simulate a swiping of the magnetic stripe card across read heads of a magnetic stripe reader (MSR),
   wherein the custom bit sequence is configured to improve acceptance of the first bit sequence transmitted within the third bit sequence by a point-of-sale (POS) terminal.

10. The non-transitory computer-readable storage medium of claim 9, wherein the second bit sequence includes cardholder name information.

11. The non-transitory computer-readable storage medium of claim 9,
    wherein the first bit sequence includes start bits representing a start character, the start character specified by the first format to indicate a start of the first track, and
    wherein the instructions to generate the second bit sequence further configure the electronic device to change one or more bits within the second bit sequence to eliminate occurrence of the start bits in forward or reverse bit-order.

12. The non-transitory computer-readable storage medium of claim 9,
    wherein the first bit sequence includes end bits representing an end character, the end character specified by the first format to indicate an end of the first track, and
    wherein the instructions to generate the second bit sequence further configure the electronic device to change one or more bits within the second bit sequence to eliminate occurrence of the end bits in forward or reverse bit-order.

13. The non-transitory computer-readable storage medium of claim 9,
    wherein the instructions to transmit the series of magnetic-field pulses configure the electronic device to:
    transmit pulses corresponding to the first bit sequence at a first bit rate, and
    transmit pulses corresponding to the second bit sequence at a second bit rate, and
    wherein the first and second bit rates being different.

14. The non-transitory computer-readable storage medium of claim 9, wherein the third bit sequence includes the first bit sequence in both forward and reverse bit-order.

15. The non-transitory computer-readable storage medium of claim 14,
    wherein the instructions to transmit the series of magnetic-field pulses configure the electronic device to:
    transmit pulses corresponding to the first bit sequence in forward bit-order at a first bit rate,
    transmit pulses corresponding to the second bit sequence in forward or reverse bit-order at a second bit rate, and
    transmit pulses corresponding to the first bit sequence in reverse bit-order at a third bit rate, and
    wherein the first, second, and third bit rates being different.

16. The non-transitory computer-readable storage medium of claim 9,
    wherein the instructions further configure the electronic device:
    determine a location of the electronic device, and
    determine a structure of the third bit sequence based on the location, and
    wherein the instructions to concatenate arrange the first bit sequence and the second bit sequence in accordance with the structure.

17. An electronic device comprising:
    a processor;
    an inductive loop; and
    a memory storing processor-executable instructions to configure the processor to make a contactless payment, comprising instructions to:
    determine a first bit sequence having a first format of a first track of a magnetic stripe card, the first bit sequence encoding first information required by the first format,
    determine a second bit sequence based on a second format of a second track of the magnetic stripe card, the second bit sequence omitting at least some second information required by the second format, replacing the at least some second information omitted from the second bit sequence with a custom bit sequence, concatenate the first bit sequence in forward or reverse bit-order with the second bit sequence, including the custom bit sequence, in forward or reverse bit-order to form a third bit sequence, and transmit the third bit sequence from the inductive loop as a series of magnetic-field pulses to electronically simulate a swiping of the magnetic stripe card across read heads of a magnetic stripe reader (MSR), wherein the custom bit sequence is configured to improve acceptance of the first bit sequence transmitted within the third bit sequence by a point-of-sale (POS) terminal.

18. The electronic device of claim 17, wherein the instructions to transmit the series of magnetic-field pulses further configure the processor to:

transmit pulses corresponding to the first bit sequence at a first bit rate, and transmit pulses corresponding to the second bit sequence at a second bit rate, and wherein the first and second bit rates being different.

19. The electronic device of claim 17, wherein the third bit sequence includes the first bit sequence in both forward and reverse bit-order.

20. The electronic device of claim 17, wherein the instructions further configure the processor to:

determine a location of the electronic device, and determine a structure of the third bit sequence based on the location, and wherein the instructions to concatenate arrange the first bit sequence and the second bit sequence in accordance with the structure.

\* \* \* \* \*